United States Patent [19]
Burke et al.

[11] Patent Number: 5,715,474
[45] Date of Patent: *Feb. 3, 1998

[54] SIMULTANEOUS CONTROL OF RADIO FREQUENCY MODEM IN A MULTI-TASKING SYSTEM USING A SINGLE SESSION MANAGER PROGRAM WITH SEPARATE COMMAND QUEUE FOR EACH APPLICATION PROGRAM

[75] Inventors: Christopher John Burke, Maple Valley; Erez Nir, Bellevue; Janice Marie Chaffee, Auburn, all of Wash.

[73] Assignee: Motorola, Inc., Schaumburg, Ill.

[*] Notice: The term of this patent shall not extend beyond the expiration date of Pat. No. 5,327,558.

[21] Appl. No.: 876,662

[22] Filed: Apr. 30, 1992

[51] Int. Cl.$^6$ .................................................. G06F 13/38
[52] U.S. Cl. .................... 395/826; 395/841; 395/682
[58] Field of Search ............................. 395/650, 250, 395/200.12, 200.2, 892, 826, 700, 825, 827, 840, 841, 682; 370/389, 402

[56] References Cited

U.S. PATENT DOCUMENTS

| | | | |
|---|---|---|---|
| 4,363,093 | 12/1982 | Davis et al. ........................ | 395/200.2 |
| 4,754,395 | 6/1988 | Weisshaar et al. .................. | 395/650 |
| 4,768,150 | 8/1988 | Chang et al. ...................... | 395/200.2 |
| 4,835,685 | 5/1989 | Kun .................................. | 395/650 |
| 5,012,409 | 4/1991 | Fletcher et al. ................... | 395/650 |
| 5,016,161 | 5/1991 | Van Loo et al. ................... | 395/575 |
| 5,136,718 | 8/1992 | Haydt ............................... | 395/800 |
| 5,166,930 | 11/1992 | Braff et al. ...................... | 370/94.1 |
| 5,325,361 | 6/1994 | Lederer et al. ................... | 370/94.1 |
| 5,327,558 | 7/1994 | Burke et al. ..................... | 395/650 |

OTHER PUBLICATIONS

Millikin, Michael "Novel NetWare 386: platforms for integration into DCE", Patricia Seybold's Network Monitor, v5 n9 p1(14) [Fulltext copy], Sep. 1990.
Blankenhorn, Dana "Motorola rolls out WaveGuide, a wireless API", Newsbytes, Feb. 4, 1992.
Free, Gordon "Programming with communication protocol stacks" Dr. Dobb's Journal v17 n3 p.72, Mar. 1992.
DeJean D., "Housebreaking a LAN? Eliminate the winins" PC-Computing Apr. 1991 v4 No. 4 p.226(3)–Fulltext copy.

*Primary Examiner*—Dinh C. Dung
*Attorney, Agent, or Firm*—Donna Rogers Maddox

[57] ABSTRACT

A data communication method provides management and control functions to allow access to a shared radio frequency communication device by multiple concurrently executing software applications. A predetermined set of commands common to all of the software applications enable a consistent, high-level software interface to the communication device. A single computer program controls the communication device and permits simultaneous independent interface to each of the software applications.

11 Claims, 18 Drawing Sheets

SIMULTANEOUS CONTROL OF RADIO FREQUENCY MODEM IN A MULTI-TASKING SYSTEM USING A SINGLE SESSION MANAGER PROGRAM WITH SEPARATE COMMAND QUEUE FOR EACH APPLICATION PROGRAM

RELATED INVENTIONS

The present invention is related to the following inventions:

(1) "Method Of Data Communication For Radio Frequency Modems Requiring Different Communications Protocols", having Ser. No. 07/876,644, filed concurrently herewith, and assigned to the assignee of the present invention now abandoned.

(2) "Notification Method For Conserving Current Drain In A Radio Frequency Communication System", having Ser. No. 07/876,888, filed concurrently herewith, and assigned to the assignee of the present invention now abandoned.

(3) "Method For Asynchronous Application Communication", now U.S. Pat. No. 5,327,558, filed concurrently herewith, and assigned to the assignee of the present invention.

TECHNICAL FIELD

This invention relates generally to data communication and, in particular, to a method for controlling concurrent access to a shared data communication device by a plurality of data processing applications.

BACKGROUND OF THE INVENTION

Known technology supports access to a radio frequency (RF) data communication device by only one program at a time. Traditionally this has been done by using RF data communication devices as part of an embedded system. The user's equipment would include a special-purpose transceiver equipped with an RF data communication device (e.g. modem) and integrated software. This integrated software is programmed specifically to work with a particular RF modem. The software also has no provision for sharing the communication device with other software applications executing on the user's equipment.

Many contemporary general-purpose subscriber units (e.g. portable computers) allow several programs to run at once. This is called multi-tasking. Currently, there is no means for a portable computer operating in a multi-tasking mode to conduct RF communication via a single shared RF communication device. There is a significant need for such capability in the art.

For example, a user running several software applications simultaneously could receive stock quotes, while sharing spreadsheet data with another user, and sending two-way messages with yet a different user. Under these conditions, the RF data communication device becomes a shared resource, and communication activities initiated by one program impact those initiated by another program.

Software application developers do not usually build specialized knowledge of unrelated programs into their own software application. The interaction between unrelated, communicating programs often causes communication malfunctions, effectively rendering the communication device inoperative. Therefore, there is a significant need in the area of radio frequency data communication to provide a shared program to perform communication device-related functions on behalf of multiple concurrently executing software applications.

SUMMARY OF THE INVENTION

The present invention has utility in managing radio RF data communication via a shared RF data communication device being accessed by multiple software programs simultaneously.

In the present invention there is provided a method of data communication in which a shared radio frequency communication device is managed in a way to allow for simultaneous access by multiple concurrently executing software applications. This is a significant advantage over the current technology of supporting only single, exclusive access to such a communication device. Such embedded systems are limited to a specialized software application and require knowledge of communication protocols in order to be developed.

Thus it is an advantage of the present invention to provide a method by which multiple concurrently executing software applications may share and utilize a single communication device.

It is also an advantage of the present invention to provide a consistent high-level software interface to the shared communication device.

Yet another advantage of the present invention is to provide real-time and communication management functions, thereby allowing software application development by general programmers rather than by communication specialists.

According to one aspect of the invention, a data communication method is provided for controlling access to a shared radio frequency communication device by a number of software applications simultaneously. In a data processing system comprising a processor, a memory for storing a plurality of software applications, and a shared radio-frequency modem, a method for managing the shared radio-frequency modem comprising: (a) providing one predetermined interface in the form of a command set common to all of the software applications; and (b) providing a single computer program that controls the radio-frequency modem and permits simultaneous, independent interface to each of the software applications by way of the predetermined set of commands.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
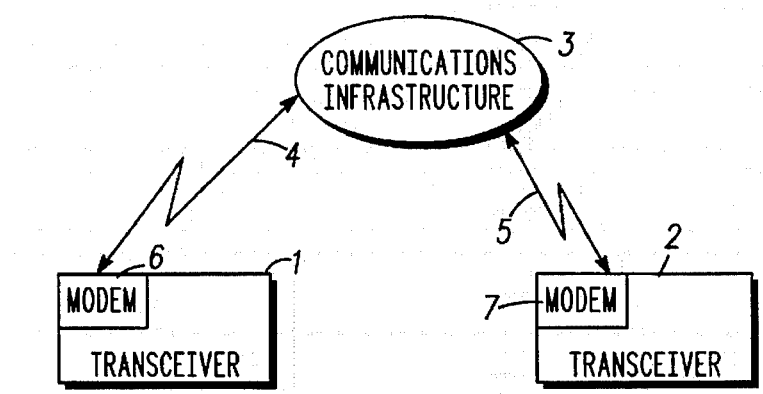
FIG. 1 shows a block diagram depicting a pair of transceivers communicating via radio frequency with a communications infrastructure in accordance with one aspect of the invention.

FIG. 1 shows a block diagram depicting a pair of transceivers 1 and 2 communicating via radio frequency (RF) with a communications infrastructure 3 in accordance with a preferred embodiment of the invention. Device 1 sends and receives RF signals 4 to and from communications infrastructure 3 via modem 6. Communications infrastructure 3 sends and receives RF signals 5 to and from device 2 via modem 7. In this way data is transferred between devices 1 and 2.

Figure 2:
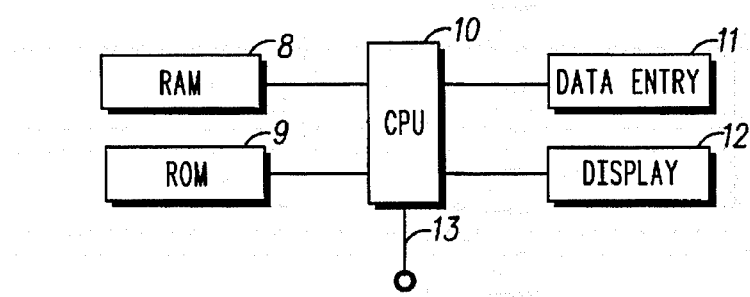
FIG. 2 shows a block diagram of a data processing portion of a communications device in accordance with a preferred embodiment of the invention.

FIG. 2 shows a block diagram of a data processing portion of a communications device in accordance with a preferred embodiment of the invention. The data processing portion is used to carry out the method and comprises central processing unit (CPU) 10, random access memory (RAM) 8, read only memory (ROM) 9, data entry means 11, display 12, and input/output (I/O) terminal 13. Data entry means 11 and display 12 may be any appropriate type to enable a system user to enter data and commands into the system and to receive information from the system. Likewise, CPU 10, RAM 8, and ROM 9 are of suitable design depending upon the system requirements. Data and control information is output to and input from suitable communications equipment (not shown), such as a wire-line modem or RF modem via I/O terminal 13.

Figure 3:
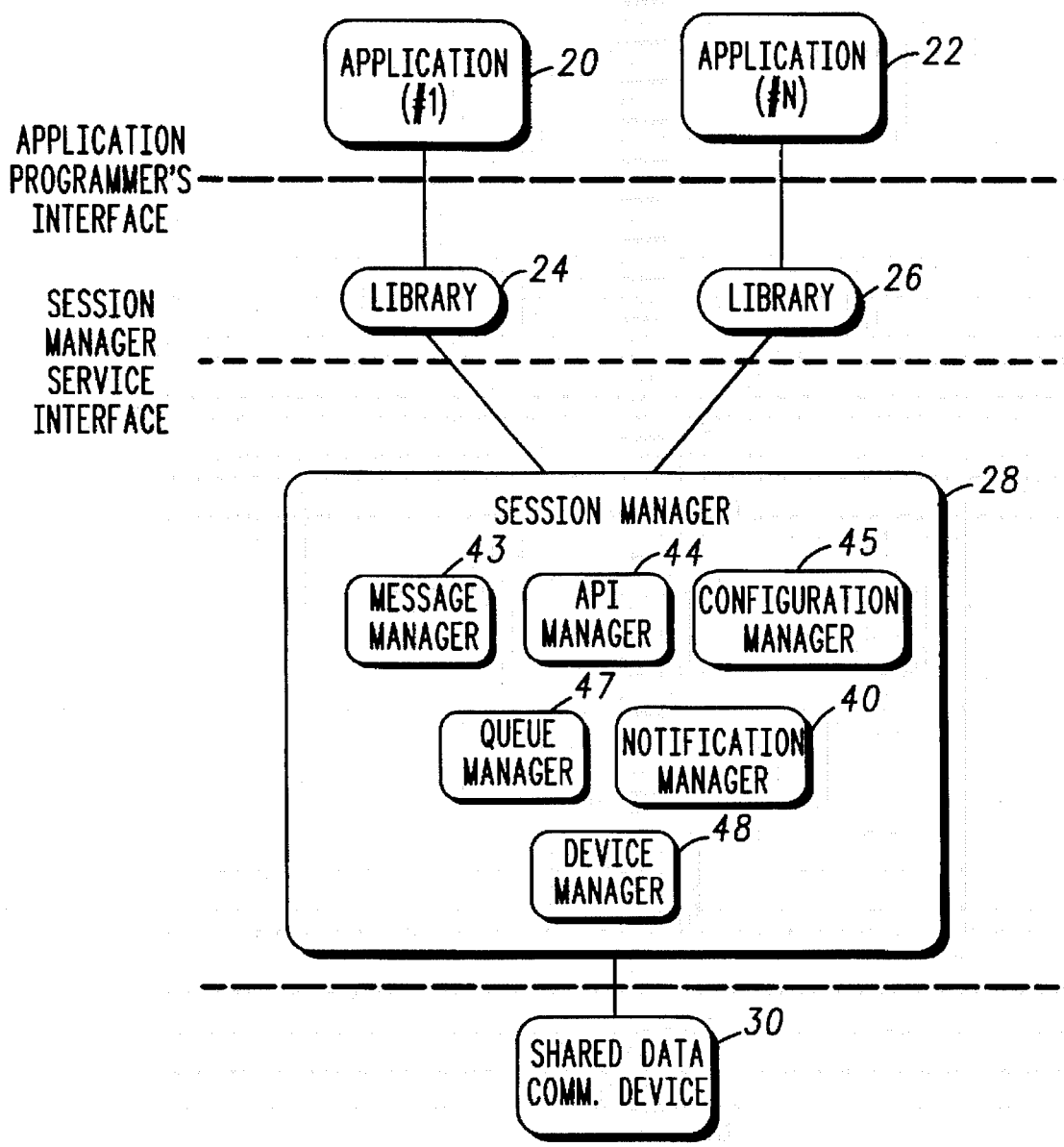
FIG. 3 shows a functional block diagram of a method for controlling concurrent access to a shared data communication device in accordance with a preferred embodiment of the invention.

FIG. 3 shows a functional block diagram of a method for controlling concurrent access to a shared data communication device in accordance with a preferred embodiment of the invention. Different software applications, 20 and 22, are linked to libraries, 24 and 26, of communication routines. The libraries, 24 and 26, allow programs written in a specific programming language to access a communication device through a predetermined set of function calls, as will be explained in greater detail below.

The library comprises a set of functions which are called from within an application. In a preferred embodiment the set of library functions comprises functions such as open_session, close_session, get_message, send_message, get_number_messages, get_notification_config, set_notification_configuration, and get_number_messages. It will be apparent that other library functions may be substituted or added if desired.

The interface between the multiple software applications, 20 and 22, and the libraries, 24 and 26, constitutes the Application Programmer's Interface (API), which defines a set of conventions for collaboration between a software application (e.g., 20) and the Session Manager 28. These conventions take the form of descriptions of communication subroutines and their parameters for a specific programming language, such as 'C'.

The library embodies knowledge both of the programming language in which the corresponding application 20 or 22 is coded, and knowledge of the interface between itself and the Session Manager 28. In the event that both applications are coded in a single programming language (e.g. the 'C' programming language), libraries 24 and 26 are identical in both general and specific detail; under these conditions libraries 24 and 26 may be equivalently replaced by a single, shared library (in another embodiment of the invention, not shown in FIG. 3). In the event that each application is coded in a unique programming language (e.g. box 20 is a 'C' application and box 22 is a 'C++' application using an incompatible compiler) library 24 and library 26 differ from one another in detail but serve equivalent purposes (i.e. embody equivalent API's) for each programming language.

The API describes how software applications 20 and 22 communicate using the invention. The library 24 and 26 is a software component, which is linked to a software application that needs to communicate; it converts interface conventions (the API) from a specific programming language into messages that can be passed to the Session Manager 28 using a prescribed operating system, such as MS-DOS (commercially available from Microsoft Corp., Redmond, Wash.), and a prescribed inter-process communication technique, such as software interrupts.

The Session Manager 28 manages all interaction with a shared data communication device 30 and provides the functionality necessary to share the device among several software applications 20 and 22. The Session Manager accepts a message from the library 24 and 26 and responds by scheduling and performing a communication function described in the message. A response is then passed back to the software application 20 and 22.

The Session Manager 28 comprises the Message Manager 43, the API Manager 44, the Configuration Manager 45, the Queue Manager 47, the Notification Manager 40, and the Device Manager 48. These modules work together to provide the queuing, scheduling, and control to enable the Shared Data Communication Device 30 to be shared between software applications 20 and 22, as will be explained in further detail below.

Figure 4:
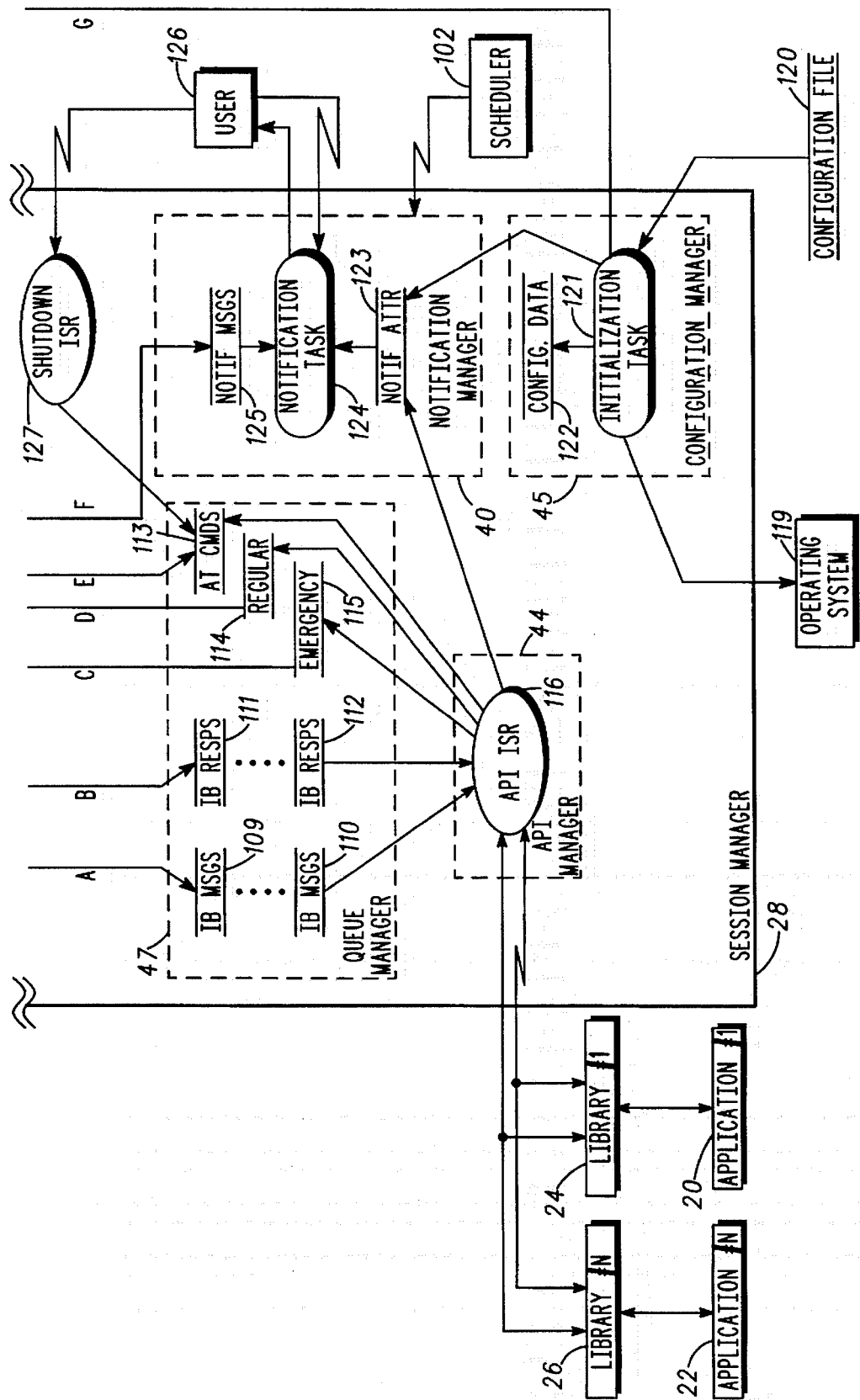
FIGS. 4 and 5 together show a more detailed functional block diagram of a method for controlling concurrent access to a shared data communication device in accordance with a preferred embodiment of the invention.
Figure 5:
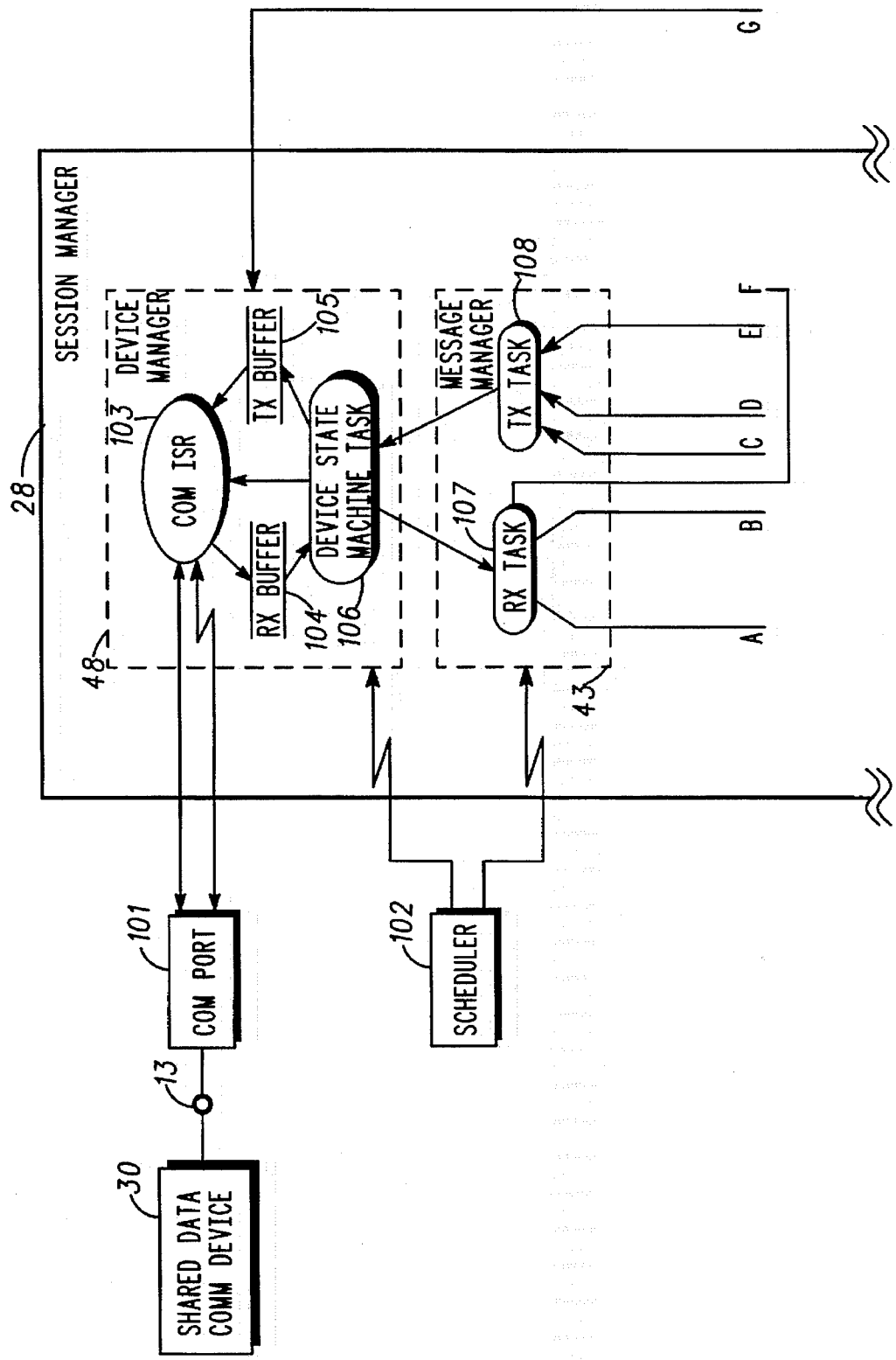

FIGS. 4 and 5 together show a more detailed functional block diagram of a method for controlling concurrent access to a shared data communication device in accordance with a preferred embodiment of the invention.

Referring first to FIG. 4, application 20 interfaces to library 24 via a predetermined set of commands. Library 24 passes data and control information to Session Manager 28 by way of API Manager 44.

API Manager 44 comprises the API Interrupt Service Routine (ISR) 116 which receives in-bound messages and in-bound responses from Queue Manager 47. The API ISR 116 also sends messages with the priorities "emergency" or "regular" and passes modem control commands (such as Hayes® Standard AT commands) to the Queue Manager 47. The API ISR 116 also sets Notification Attributes 123 in the Notification Manager 40.

The Configuration Manager 45 comprises the Initialization Task 121 and Configuration Data store 122. The Initialization Task 121 reads session attribute data from the Configuration File 120, registers with the Operating System 119 as a Terminate and Stay Resident (TSR) program and writes session attribute data (e.g. baud rate) to Configuration Data store 122. The Initialization Task 121 also initializes the shared communication device via the Device Manager 48 and sets the default attributes in the Notification Attributes data store 123 in the Notification Manager 40.

The Notification Manager 40 comprises the Notification Attributes data store 123, the Notification Task 124, and the Notification Messages data store 125. The Notification Task 124 is periodically scheduled to run by the Scheduler 102, in order to facilitate the control switch between this task and others running on the data processor. The Notification Task 124 reads data from the Notification Attributes data store 123 and reads notification messages from the Notification Messages data store 125. The Notification Task 124 can display a notification message to the User 126. The User 126 can acknowledge the receipt of the notification message by sending a response (e.g. pressing a key on the keyboard) to the Notification Task 124.

The Queue Manager 47 comprises queues 109–110 for in-bound messages, queues 111–112 for in-bound responses to previously sent messages, a data store 115 for out-bound emergency priority messages, a data store 114 for out-bound regular priority messages, and a data store 113 for Hayes® Standard AT commands used to control the shared communication device. For each session a set of in-bound queues (IB Msgs. 109–110 and IB Resps. 111–112) is allocated. Each application 20, 22 can open multiple sessions, and the Session Manager 28 can support multiple applications 20, 22.

The in-bound message queues 109–110 receive messages from the Receive Task 107 of Message Manager 43 (FIG. 5). The API Manager 44 retrieves the messages in a first-in-first-out (FIFO) manner from the in-bound message queues 109–110. The in-bound message response queues 111–112 receive message responses from the Receive Task 107 of Message Manager 43. The API Manager 44 retrieves the messages in a first-in-first-out (FIFO) manner from the in-bound message response queues 111–112.

The emergency message data store 115 receives emergency messages from the API Manager 44 and stores them for retrieval by the Transmit Task 108 of the Message Manager 43. The regular message data store 114 receives regular messages from the API Manager 44 and stores them for retrieval by the Transmit Task 108 of the Message Manager 43. The AT Commands data store 113 receives Hayes® Standard AT commands from the API Manager 44 and stores them for retrieval by the Transmit Task 108 in the Message Manager 43. The AT Commands data store 113 receives device shutdown commands from the Shutdown Interrupt Service Routine (ISR) 127 and stores them for retrieval by the Transmit Task 108 in the Message Manager 43.

Regarding FIG. 5 now, the Message Manager 43 comprises a Receive Task 107 and a Transmit Task 108. The Receive Task 107 retrieves data from the Device Manager 48 and routes the data to the in-bound message queue 109–110 or the in-bound message response queue 111–112 of the Device Manager 48. The Receive Task also writes notification messages to the Notification Manager 40.

The Transmit Task 108 retrieves regular and emergency messages, and Hayes® Standard AT commands, from the Queue Manager 47 and passes them on to the Device Manager 48. The Message Manager 43 is periodically scheduled to run by a Scheduler 102 interrupt to facilitate the control switch between the Receive and Transmit Tasks.

The Device Manager 48 comprises a Communication (COM) Interrupt Service Routine (ISR) 103, a Receive Buffer 104, a Transmit Buffer 105, and a Device State Machine Task 106. The Device State Machine Task 106 is driven by the Scheduler 102 and controls the message traffic from the Message Manager 43 to/from the Transmit Buffer 105 and the Receive Buffer 104, respectively.

The Device State Machine Task 106 sends commands to the COM ISR 103. The COM ISR 103 sends/receives data bytes to/from the Communication Port 101 and issues/handles hardware interrupts to/from the Communication Port 101. Communication Port 101 is connected to the Shared Data Comm Device 30 via I/O terminal 13.

Box SESS_MGR

Figure 6:
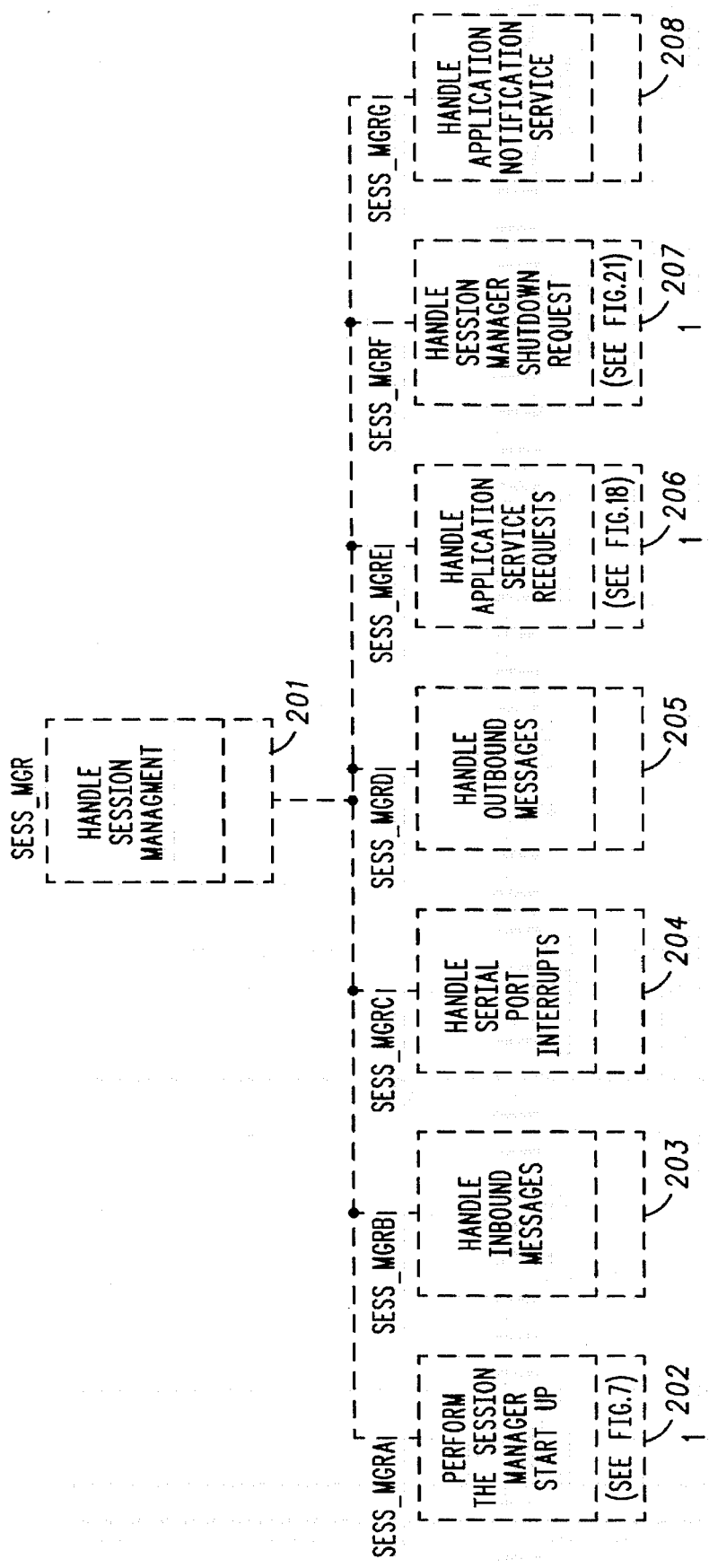
FIG. 6 shows a procedure call-tree for the routine HANDLE SESSION MANAGEMENT in accordance with a preferred embodiment of the invention.

The pseudo-code listing for FIG. 6, a procedure call-tree for the routine HANDLE SESSION MANAGEMENT 201, contains an implementation in pseudo-code of a preferred embodiment of the present invention. The procedure HANDLE SESSION MANAGEMENT 201 calls one or more of the sub-procedures, PERFORM THE SESSION MANAGER START UP 202, HANDLE INBOUND MESSAGES 203, HANDLE SERIAL PORT INTERRUPTS 204, HANDLE OUTBOUND MESSAGES 205, HANDLE APPLICATION SERVICE REQUESTS 206, HANDLE SESSION MANAGER SHUTDOWN REQUESTS 207, and HANDLE APPLICATION NOTIFICATION SERVICE 208, depending on what type interrupt is received.

```
/* Startup and load session manager */
PERFORM THE SESSION MANAGER START UP [A]
/* Terminate and Stay Resident */
Exit
/* when an interrupt occurs wake up and process */
CASE OF interrupt DO
   CASE scheduler interrupt :
      IF scheduler interrupt is for "received messages"
         THEN
            HANDLE INBOUND MESSAGES [B]
         ENDIF
      IF scheduler interrupt is for "sending messages"
         THEN
            HANDLE OUTBOUND MESSAGES [D]
         ENDIF
      IF scheduler interrupt is for "application notification"
         THEN
            HANDLE APPLICATION NOTIFICATION SERVICE [G]
         ENDIF ENDCASE
   CASE serial port interrupt :
      HANDLE SERIAL PORT INTERRUPTS [C]
   CASE application interrupt :
      HANDLE APPLICATION SERVICE REQUESTS [E]
   CASE user interrupt/hot-key combination :
      HANDLE SESSION MANAGER SHUTDOWN REQUEST [F]
   OTHERS :
      treat error
ENDCASE
```

The Session Manager is loaded and started up by calling the routine PERFORM THE SESSION MANAGER STARTUP 202. The Session Manager 28 Terminates and Stays Resident, waiting for an interrupt to occur. The interrupt causes the Session Manager 28 to "wake up" and process the type of interrupt that has occurred.

When a scheduler interrupt occurs, the procedure HANDLE INBOUND MESSAGES 203 is called to handle any received messages, if the scheduler interrupt is for "received messages". The procedure HANDLE OUTBOUND MESSAGES 205 is called to handle any sent (posted) messages, if the scheduler interrupt is for "sending messages". The procedure HANDLE APPLICATION NOTIFICATION SERVICE 208 is called to notify the user or the application when in-bound messages arrive, if the scheduler interrupt is for "application notification".

When a serial port interrupt occurs, the procedure HANDLE SERIAL PORT INTERRUPTS 204 is called to handle any event generated by the shared communication device connected through the serial port.

When an application interrupt occurs, the procedure HANDLE APPLICATION SERVICE REQUESTS 206 is called to process the command set from an Application Programmer's Interface.

When a user interrupt ("hot key" combination) occurs, the procedure HANDLE SESSION MANAGER SHUTDOWN REQUEST 207 is called to terminate operation of the Session Manager 28 and unload the Session Manager 28 from memory.

The occurrence of any other interrupt is treated as an error.

Box SESS_MGRA

Figure 7:
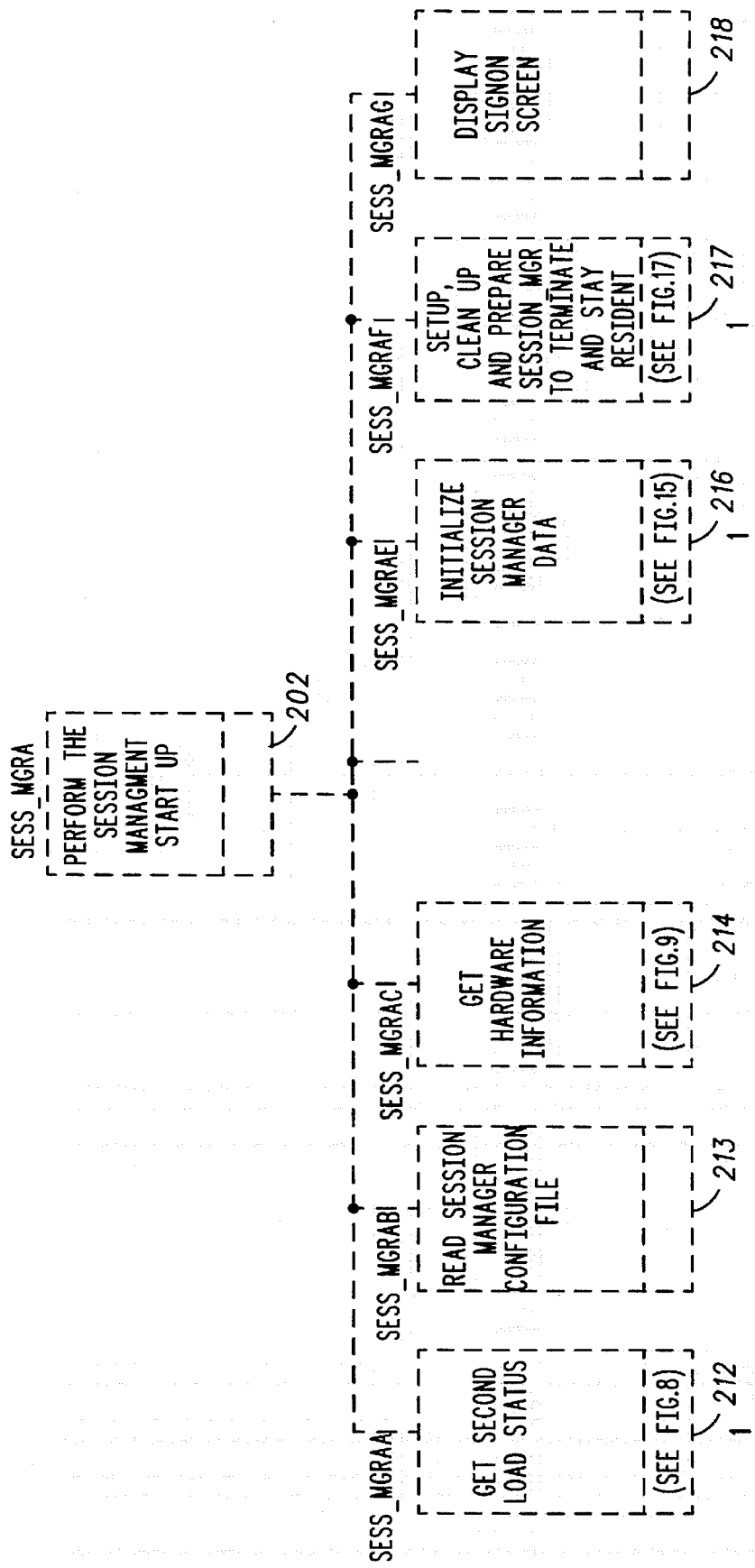
FIG. 7 shows a procedure call-tree for the routine PERFORM THE SESSION MANAGER START UP in accordance with a preferred embodiment of the invention.

The pseudo-code listing for FIG. 7 comprises a procedure call-tree for the routine PERFORM THE SESSION MANAGER START UP 202. The procedure PERFORM THE SESSION MANAGER START UP 202 calls the sub-procedures, GET SECOND LOAD STATUS 212, READ SESSION MANAGER CONFIGURATION FILE 213, GET HARDWARE INFORMATION 214, INITIALIZE SESSION MANAGER DATA 216, SETUP, CLEAN UP, AND PREPARE SESSION_MGR TO TERMINATE AND STAY RESIDENT 217, and DISPLAY SIGNON SCREEN 218, in the sequence indicated in the pseudo-code listing below.

```
GET SECOND LOAD STATUS                                              [A]
READ SESSION MANAGER CONFIGURATION FILE                             [B]
GET HARDWARE INFORMATION                                            [C]
INITIALIZE SESSION MANAGER DATA                                     [E]
SETUP,CLEAN UP AND PREPARE SESSION_MGR TO TERMINATE AND STAY RESIDENT [F]
DISPLAY SIGNON SCREEN                                               [G]
```

Box SESS_MGRAA

Figure 8:
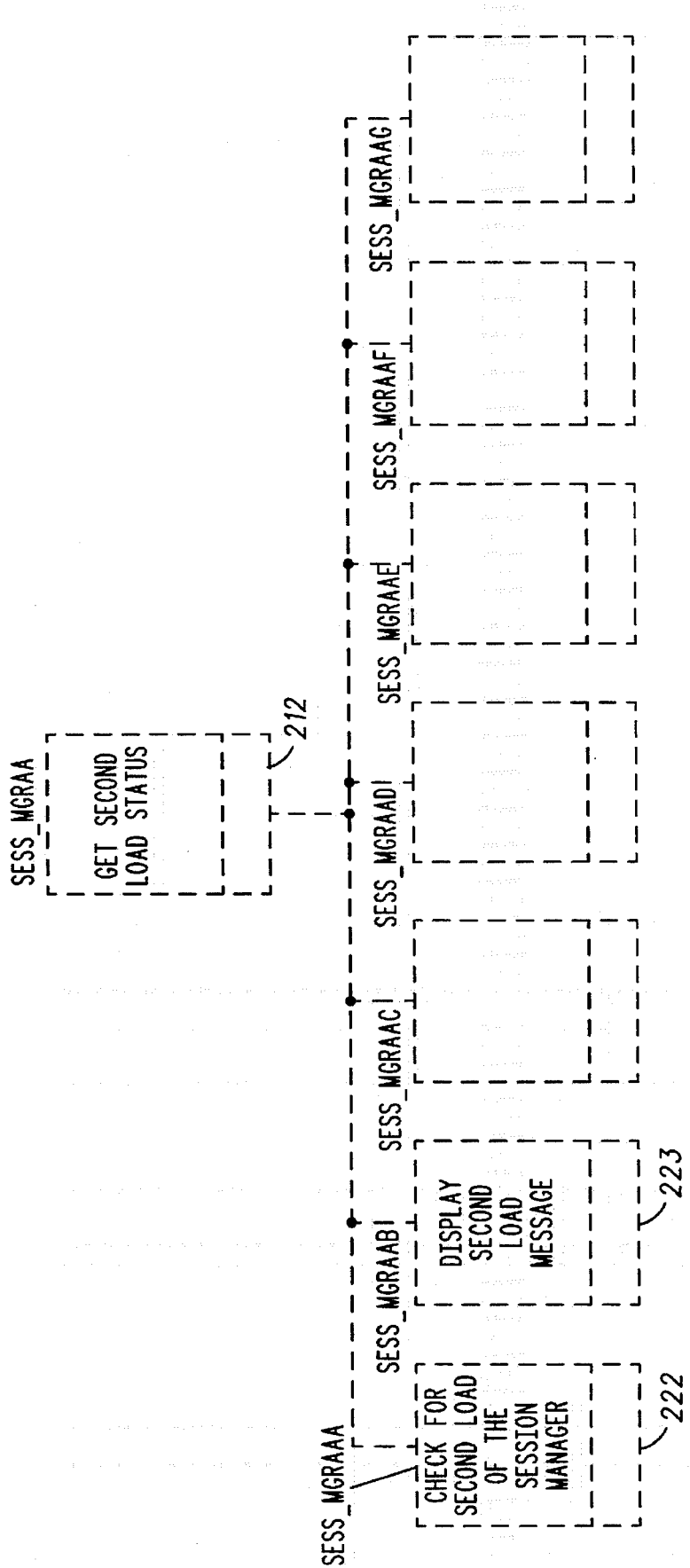
FIG. 8 shows a procedure call-tree for the routine GET SECOND LOAD STATUS in accordance with a preferred embodiment of the invention.

The pseudo-code listing for FIG. 8 comprises a procedure call-tree for the routine GET SECOND LOAD STATUS 212. The procedure GET SECOND LOAD STATUS 212 calls the sub-procedures, CHECK FOR SECOND LOAD OF THE SESSION MANAGER 222 and DISPLAY SECOND LOAD MESSAGE 223, to account for the situation that the Session Manager was loaded twice for execution.

```
already_loaded = CHECK FOR SECOND LOAD OF THE SESSION MANAGER  [A]
IF already_loaded
   THEN DISPLAY SECOND LOAD MESSAGE  [B]
      exit
ENDIF
```

Box SESS_MGRAAA

The routine CHECK FOR SECOND LOAD OF THE SESSION MANAGER 222 (FIG. 8) verifies that the Session Manager 28 (FIG. 4) is not already loaded into memory, RAM 8 (FIG. 2).

Box SESS_MGRAAB

The routine DISPLAY SECOND LOAD MESSAGE 223 (FIG. 8) displays a message to the User 126 (FIG. 4) that the Session Manager 28 (FIG. 4) load was attempted twice.

Box SESS_MGRAB

The pseudo-code listing for READ SESSION MANAGER CONFIGURATION FILE 213 (FIG. 7) is shown below. The Session Manager Configuration File 120 (FIG. 4) is opened. If it is opened without error, then storage is allocated for the Configuration Data Store 122. Parameters, such as communication parameters and notification attributes, are read from the Session Manager Configuration File 120 and written to the Configuration Data Store 122 and the Notification Attributes Data Store 123. If the Session Manager Configuration File 120 is opened with errors, an error message is displayed.

```
IF Open session manager configuration file = OK
   THEN
      Allocate data structure for session manager configuration data
      Read global parameters
         Hot-key character
         Communication parameters(COM Port, Baud rate)
         Size of inbound queue (i.e. maximum number of stored messages)
      Read applications' configuration:
         Application's session name
         Notification attributes (pop-up, tone, interval)
         Fixed user header
   ELSE
      Display error message
      exit
ENDIF
```

Box SESS_MGRAC

Figure 9:
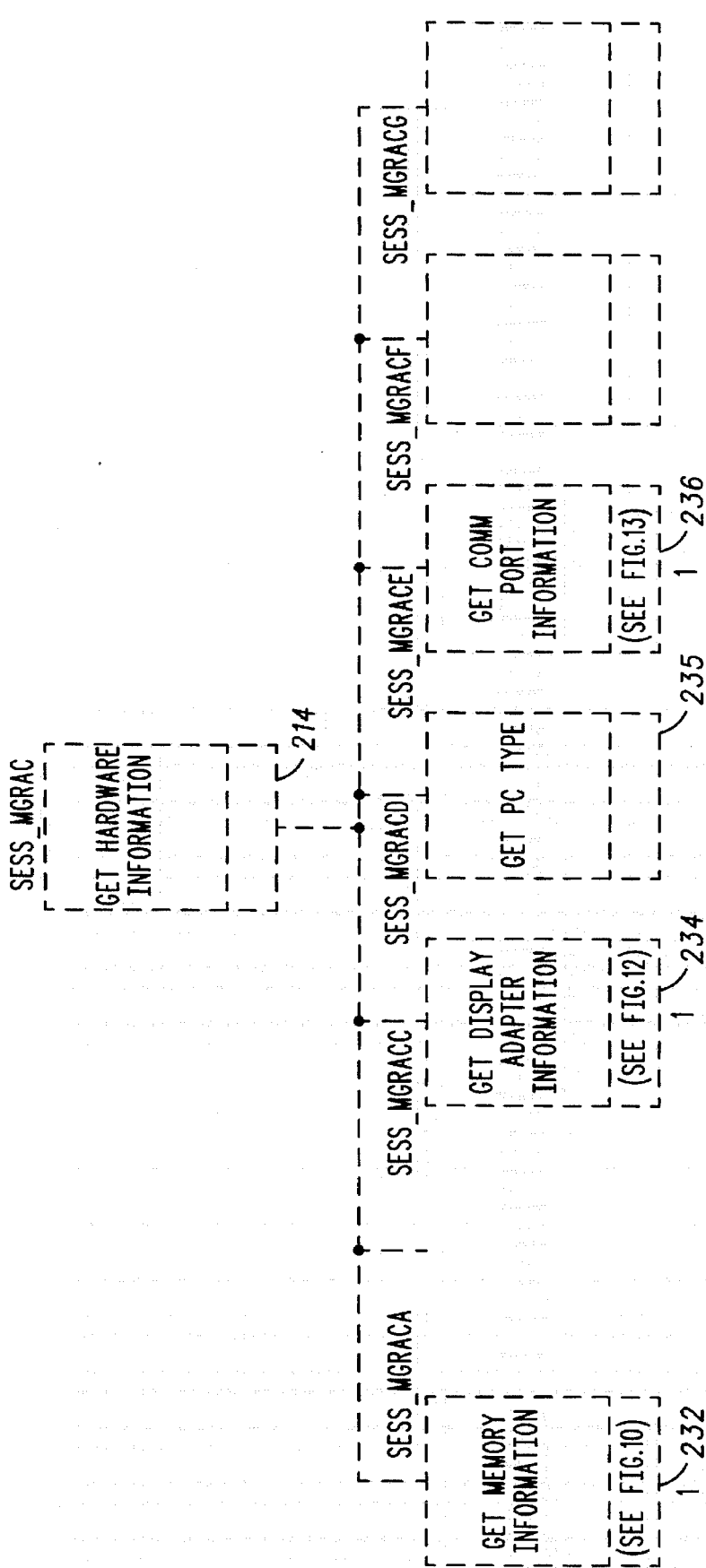
FIG. 9 shows a procedure call-tree for the routine GET HARDWARE INFORMATION in accordance with a preferred embodiment of the invention.

The pseudo-code listing for FIG. 9 comprises a procedure call-tree for the routine GET HARDWARE INFORMATION 214. The procedure GET HARDWARE INFORMATION 214 calls routines GET EMORY INFORMATION 232, GET DISPLAY ADAPTER INFORMATION 234, GET PC TYPE 235, and GET COMM PORT INFORMATION 236.

```
GET MEMORY INFORMATION [A]
GET DISPLAY ADAPTER INFORMATION [C]
GET PC TYPE [D]
GET COMM PORT INFORMATION [E]
```

Box SESS_MGRACA

Figure 10:
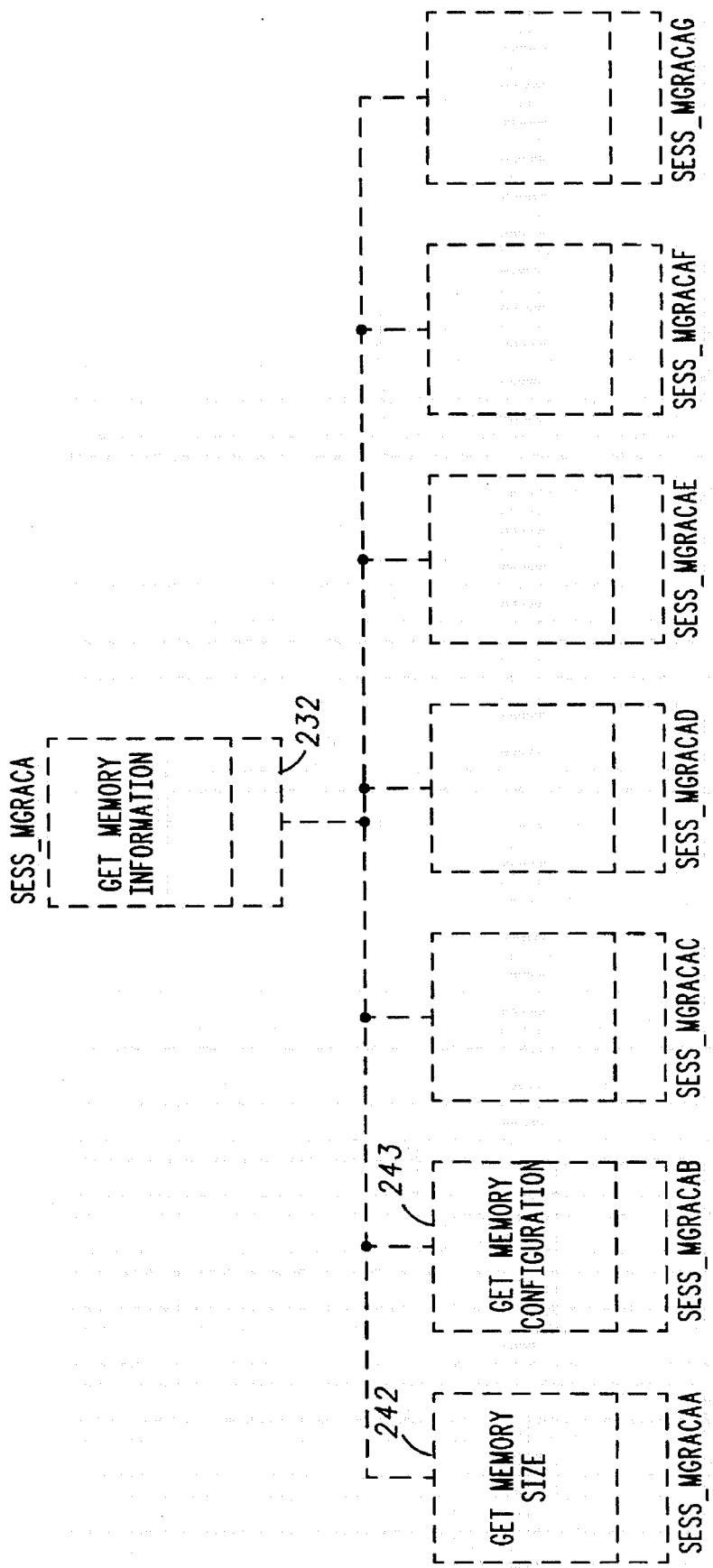
FIG. 10 shows a procedure call-tree for the routine GET MEMORY INFORMATION in accordance with a preferred embodiment of the invention.

The pseudo-code listing for FIG. 10 comprises a procedure call-tree for the routine GET EMORY INFORMATION 232. The procedure GET EMORY INFORMATION 232 calls the sub-procedures, GET EMORY SIZE 242 and GET EMORY CONFIGURATION 243, to check whether memory minimal requirements are met. If there is not enough memory, an error message is displayed to the USER 126.

```
/* Check whether memory minimal requirements are met */
GET MEMORY      SIZE         [A]
GET MEMORY      CONFIGURATION      [B]
IF not enough memory available
   THEN
      display error message
      exit
ENDIF
```

Box SESS_MGRACAA

The pseudo-code listing for GET EMORY SIZE 242 is shown below.

```
Get total memory size available for user applications,
   i.e. maximum memory minus the memory size occupied by
   DOS, TSR's etc.
```

Box SESS_MGRACAB

The pseudo-code listing for GET EMORY CONFIGURATION 243 is shown below.

```
Get the current configuration of memory
   main memory
   expended memory
```

Box SESS_MGRACC

Figure 11:
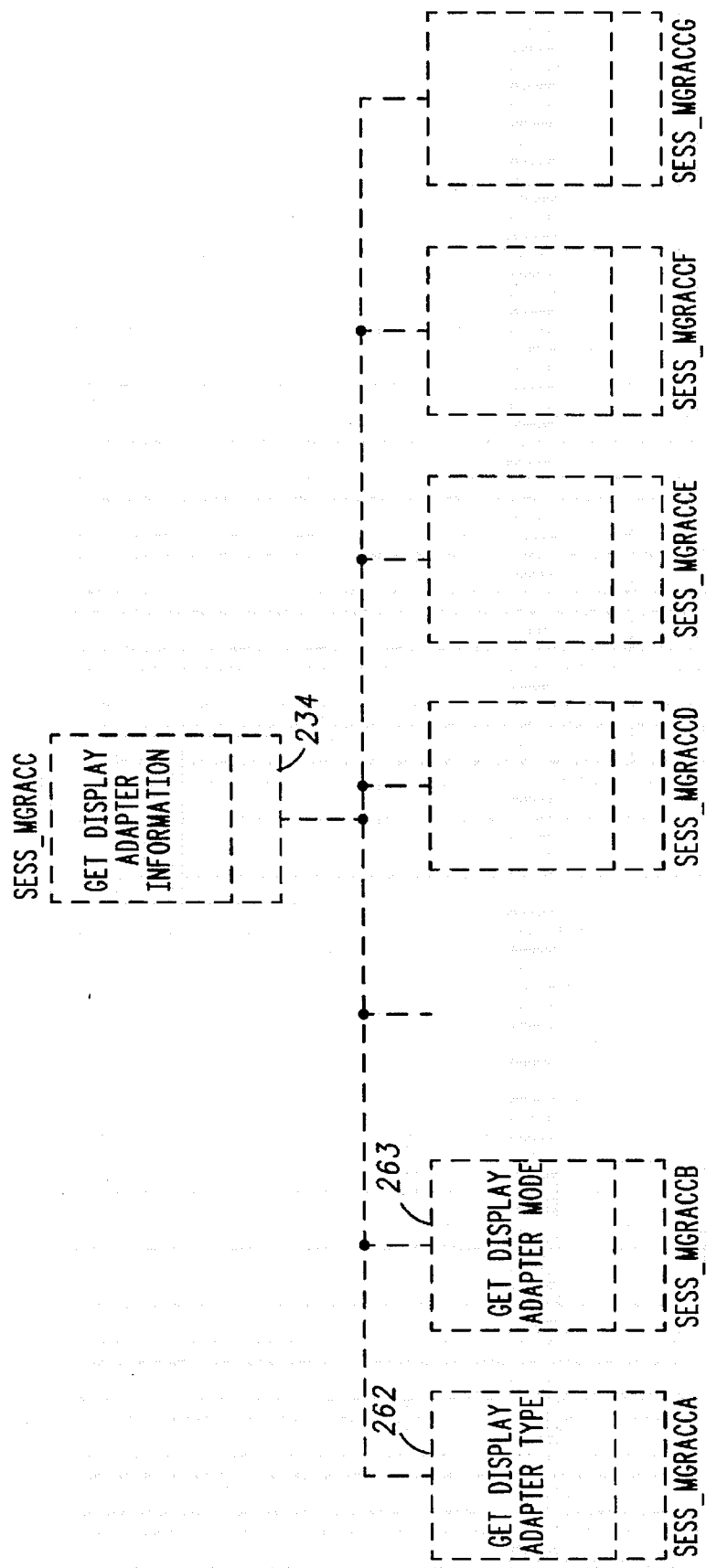
FIG. 11 shows a procedure call-tree for the routine GET DISPLAY ADAPTER INFORMATION in accordance with a preferred embodiment of the invention.

The pseudo-code listing for FIG. 11 comprises a procedure call-tree for the routine GET DISPLAY ADAPTER INFORMATION 234. The procedure GET DISPLAY ADAPTER INFORMATION 234 calls the sub-procedures, GET DISPLAY ADAPTER TYPE 262 and GET DISPLAY ADAPTER MODE 263, in the sequence indicated in the pseudo-code listing below. The original display setting is saved so that it can be restored when the Session Manager is terminated.

```
GET DISPLAY    ADAPTER TYPE    [A]    : may be MDA,CGA,EGA,MCGA,VGA
GET DISPLAY ADAPTER MODE       [B]    : TEXT,GRAPHICS (BW40,BW80,C040,C080)
No specific/minimal requirement for the display type and mode
Save original display setting in order to restore it once session manager
is terminated
```

Box SESS_MGRACCA

The routine GET DISPLAY ADAPTER TYPE 262 (FIG. 11) retrieves the current display adapter type.

Box SESS_MGRACCB

The routine GET DISPLAY ADAPTER MODE 263 (FIG. 11) retrieves the current display adapter mode.

Box SESS_MGRACD

The pseudo-code listing for GET PC TYPE 235 (FIG. 9) is shown below. If the type of data processor is an IBM™ or compatible PC™ (Personal Computer), it must be at least the XT™ version or later; otherwise; an error message is displayed via the Notification Manager 40 and execution terminates.

```
Possible PC types that are PC,XT,AT,XT286
IF the PC type == PC
    THEN
        Display error message
        exit
ENDIF
```

Box SESS_MGRACE

Figure 12:
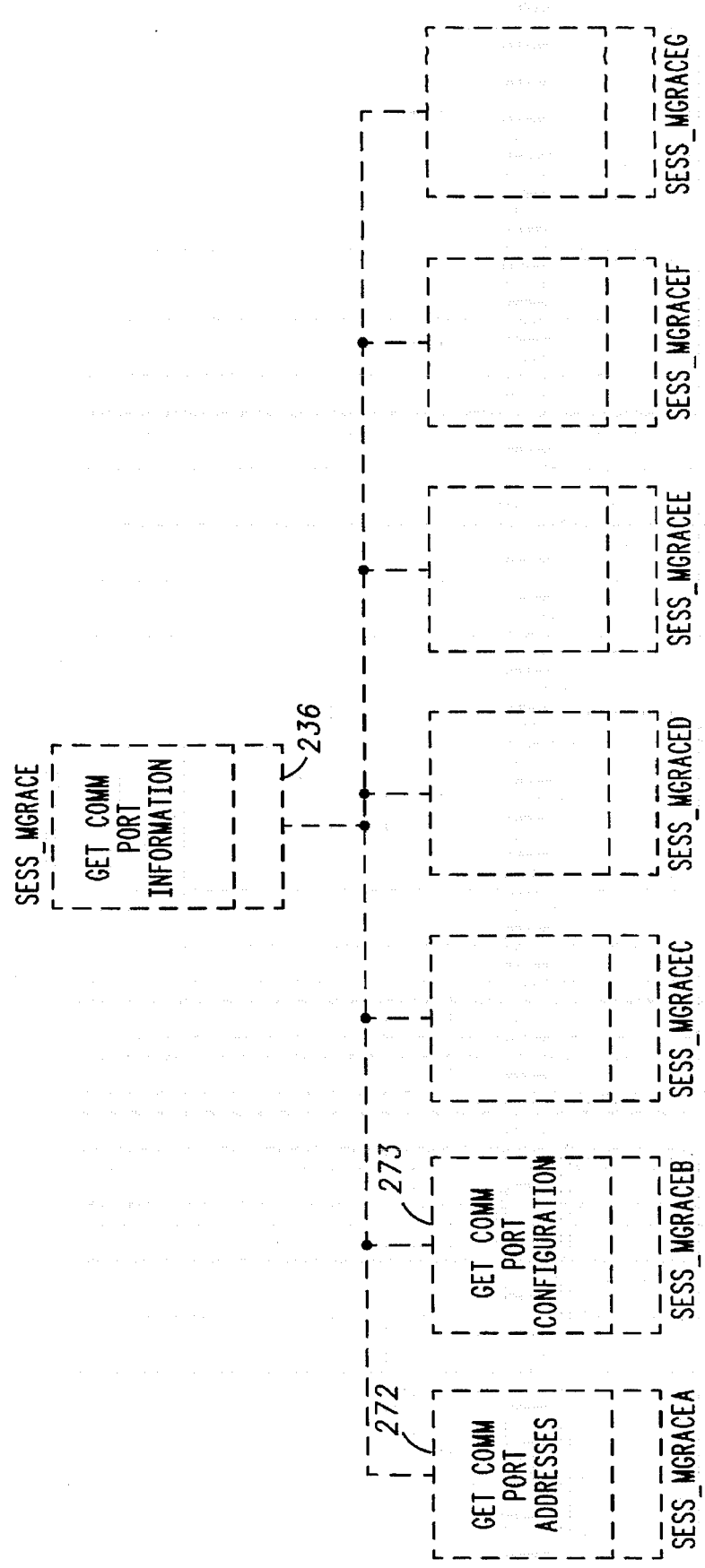
FIG. 12 shows a procedure call-tree for the routine GET COMM PORT INFORMATION in accordance with a preferred embodiment of the invention.

The pseudo-code listing for FIG. 12 comprises a procedure call-tree for the routine GET COMM PORT INFORMATION 236. The procedure GET COMM PORT INFORMATION 236 calls the sub-procedures, GET COMM PORT ADDRESSES 272 and GET COMM PORT CONFIGURATION 273, in the sequence indicated in the pseudo-code listing below. If no serial port is available, then an error message is displayed via the Notification Manager 40. The original serial port configuration is saved so that it can be restored when the Session Manager is terminated.

```
GET COMM PORT  ADDRESSES      [A]    : COM1,COM2 etc.
GET COMM PORT  CONFIGURATION  [B]    : Baud rate,stop bit,parity etc.
IF no serial port is available
    THEN
        Display an error message
        exit
ENDIF
Save original serial port configuration in order to restore it once
session manager is removed
```

Box SESS_MGRACEA

The routine GET COMM PORT ADDRESSES 272 (FIG. 12) retrieves the standard DOS COM Port 101 (FIG. 5) addresses.

Box SESS_MGRACEB

The routine GET COMM PORT CONFIGURATION 273 (FIG. 12) retrieves the configuration (e.g. baud rate, parity, stop bits) for each port and stores it in memory, RAM 8 (FIG. 2).

Box SESS_MGRAE

Figure 13:
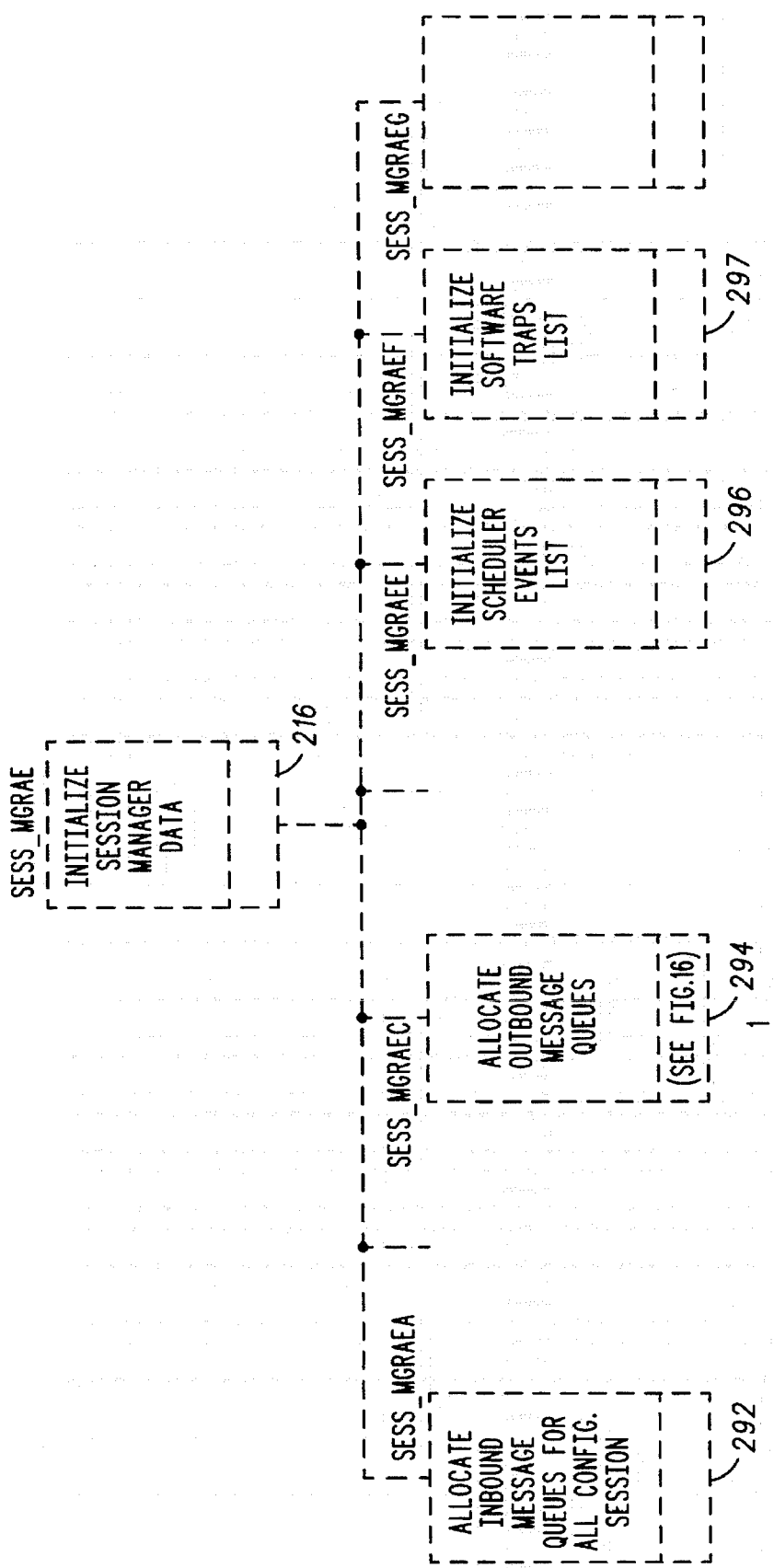
FIG. 13 shows a procedure call-tree for the routine INITIALIZE SESSION MANAGER DATA in accordance with a preferred embodiment of the invention.

The pseudo-code listing for FIG. 13 comprises a procedure call-tree for the routine INITIALIZE SESSION MANAGER DATA 216. The procedure INITIALIZE SESSION MANAGER DATA 216 calls the sub-procedures, ALLOCATE INBOUND MESSAGE QUEUES FOR ALL CONFIG SESSIONS 292, ALLOCATE OUTBOUND MESSAGE QUEUES 294, INITIALIZE SCHEDULER EVENTS LIST 296, and INITIALIZE SOFTWARE TRAPS LIST 297, in the sequence indicated in the pseudo-code listing below.

```
ALLOCATE   INBOUND   MESSAGE QUEUES   FOR ALL CONFIG   SESSIONS   [A]
ALLOCATE   OUTBOUND  MESSAGE QUEUES   [C]
INITIALIZE SCHEDULER EVENTS LIST      [E]
INITIALIZE SOFTWARE TRAPS  LIST       [F]
```

Box SESS_MGRAEA

The expanded pseudo-code listing for ALLOCATE OUTBOUND MESSAGE QUEUES FOR ALL CONFIG SESSIONS 292 is shown below and is described in sufficient detail without further explanation.

```
All sessions' inbound queues are handled in one pool.
Messages of a session are kept in a linked list.
Two pointers point to the head and tail of the memory pool.
A message is read from the serial port only if there is enough queue pool
    memory to store it(space is reserved for at least one message of
    maximum size i.e. 2K)
For each queue the following information is kept:
    Number of messages in the queue
    Number of bytes occupied by the queue messages
    Pointer to the queue start
Each message is composed of the actual data and an extra word pointing
to
    the next message in the queue.
Once the queue is full no more messages are read from the serial port,
    letting the Shared Data Communication Device 30 (FIG. 5)
    NAK messages as its queues are overflown.
A message is issued to the user suggesting that no more room for
    messages is available in the session manager queues and unless an
    application reads some of the waiting messages, new incoming host
    messages will be NAKed.
In the case of a graceful shutdown, all queue content is saved into files
    to be restored in case that the session manager is activated again.
```

Box SESS_MGRAEC

Figure 14:
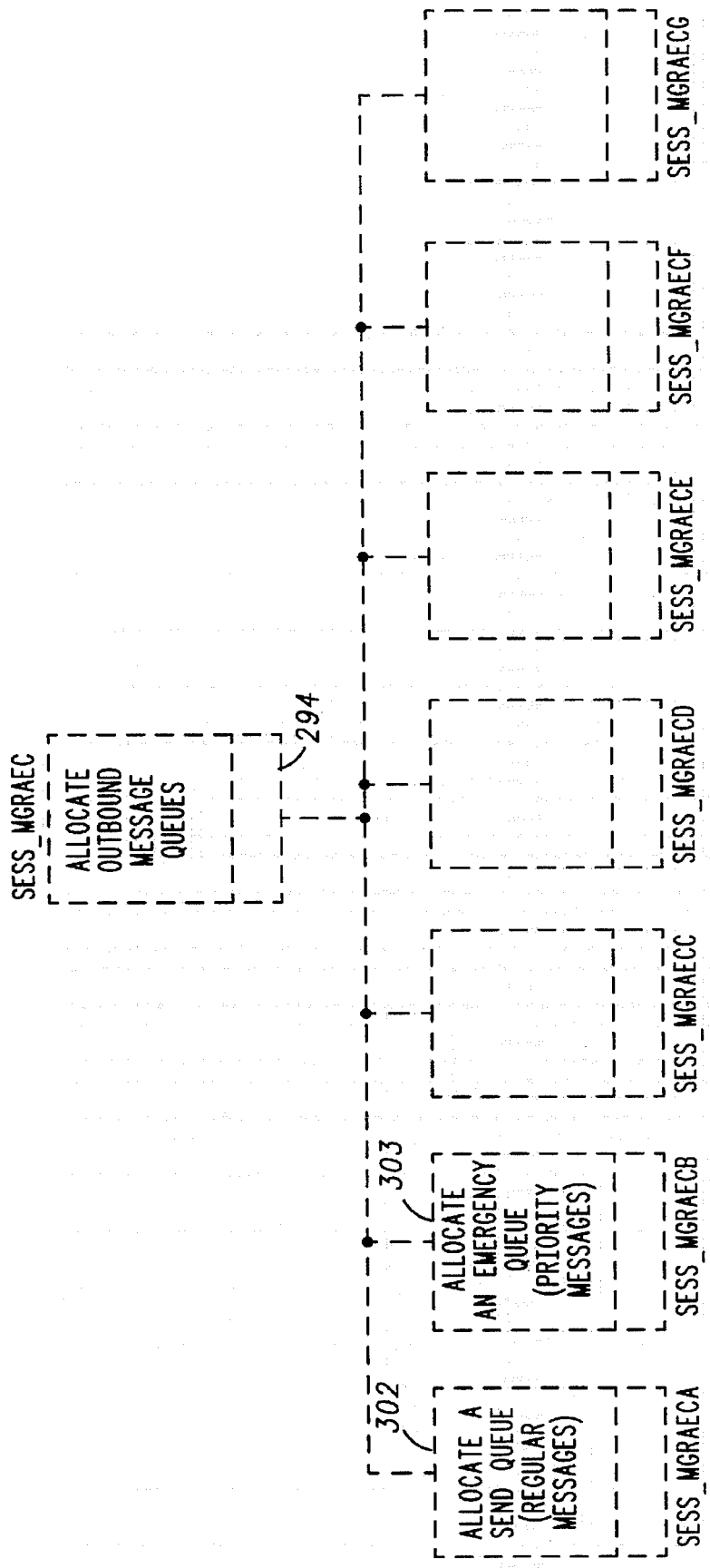
FIG. 14 shows a procedure call-tree for the routine ALLOCATE OUTBOUND MESSAGE QUEUES in accordance with a preferred embodiment of the invention.

The pseudo-code listing for FIG. 14 comprises a procedure call-tree for the routine ALLOCATE OUTBOUND MESSAGE 294 QUEUES 294. The procedure ALLOCATE OUTBOUND MESSAGE QUEUES calls the sub-procedures, ALLOCATE A SEND QUEUE (REGULAR MESSAGES) 302 and ALLOCATE AN EMERGENCY QUEUE (PRIORITY MESSAGES) 303, in the sequence indicated in the pseudo-code listing below. If an error occurs during the memory allocation for either queue, then an error message is displayed via the Notification Manager 40 and program startup is terminated.

```
ALLOCATE    A SEND QUEUE    (REGULAR MESSAGES)    [A]
IF memory allocation error
    THEN
        Display error message
        exit
ENDIF
ALLOCATE AN    EMERGENCY QUEUE    (PRIORITY    MESSAGES)    [B]
IF memory allocation error
    THEN
        Display error message
        exit
ENDIF
```

Box SESS_MGRAECA

The expanded pseudo-code listing for ALLOCATE A SEND QUEUE (REGULAR MESSAGES) 302 is shown below and is described in sufficient detail without further explanation.

```
Outbound messages are kept in a linked list.
Two pointers point to the head and tail of the memory pool allocated for
    the queue
A message is accepted and stored in this queue only if there is enough
    memory for it, otherwise the session manager will return an error
    status code to the application
For each queue the following information is kept:
    Number of messages in the queue
    Number of bytes occupied by the queue messages
    Pointer to the queue start
Each message is composed of the actual data and an extra word pointing
    to
    the next message in the queue.
When the queue is full no more messages are stored in it, letting the
    session manager NAK the application "send" requests
A message is issued to the user indicating that something is wrong (host
    not available, Shared Data Communication Device 30 (FIG. 5) low
    battery, etc.)
Unless some action is taken to fix the problem source no messages will be
    stored by the session manager to be sent to the host.
In case of graceful shutdown all queue content is saved into a file to be
    restored in case the session manager is activated again.
```

Box SESS_MGRAECB

The expanded pseudo-code listing for ALLOCATE AN EMERGENCY QUEUE (PRIORITY MESSAGES) 303 is the same as in routine ALLOCATE A SEND QUEUE (REGULAR MESSAGES) 302 and is shown above. The pseudo-code is described in sufficient detail without further explanation.

```
Same as in function ALLOCATE A SEND QUEUE (REGULAR
MESSAGES)
```

Box SESS_MGRAEE

The pseudo-code listing for INITIALIZE SCHEDULER EVENTS LIST 296 (FIG. 13) is shown below. The routine INITIALIZE SCHEDULER EVENTS LIST 296 calls the scheduler (such as CodeRunneR®, which is commercially available from Microsystems Software, Inc., Framingham, Mass.) to install the scheduler for real-time events handling. When the installation is complete, the events record for the Receive Task 107 (FIG. 5), the Transmit Task 108 (FIG. 5), and the Notification Task 124 (FIG. 4) is created.

```
Call CodeRunneR's INSTALL_SCH(service,stack_size,lock_mask)
in order to activate the scheduler
```

Box SESS_MGRAEF

The pseudo-code listing for INITIALIZE SOFTWARE TRAPS LIST 297 (FIG. 13) is shown below. The routine INITIALIZE SOFTWARE TRAPS LIST 297 calls the scheduler to install the API Manager 44 (FIG. 4) software interrupt trap routine. The software trap will be invoked when an application issues a request for an API service to the API ISR 116.

```
Call CodeRunneR's INSTALL_TRAP (trap_service,stack_size,
lock_mask) in order to make software traps handling available
```

Box SESS_MGRAF

Figure 15:
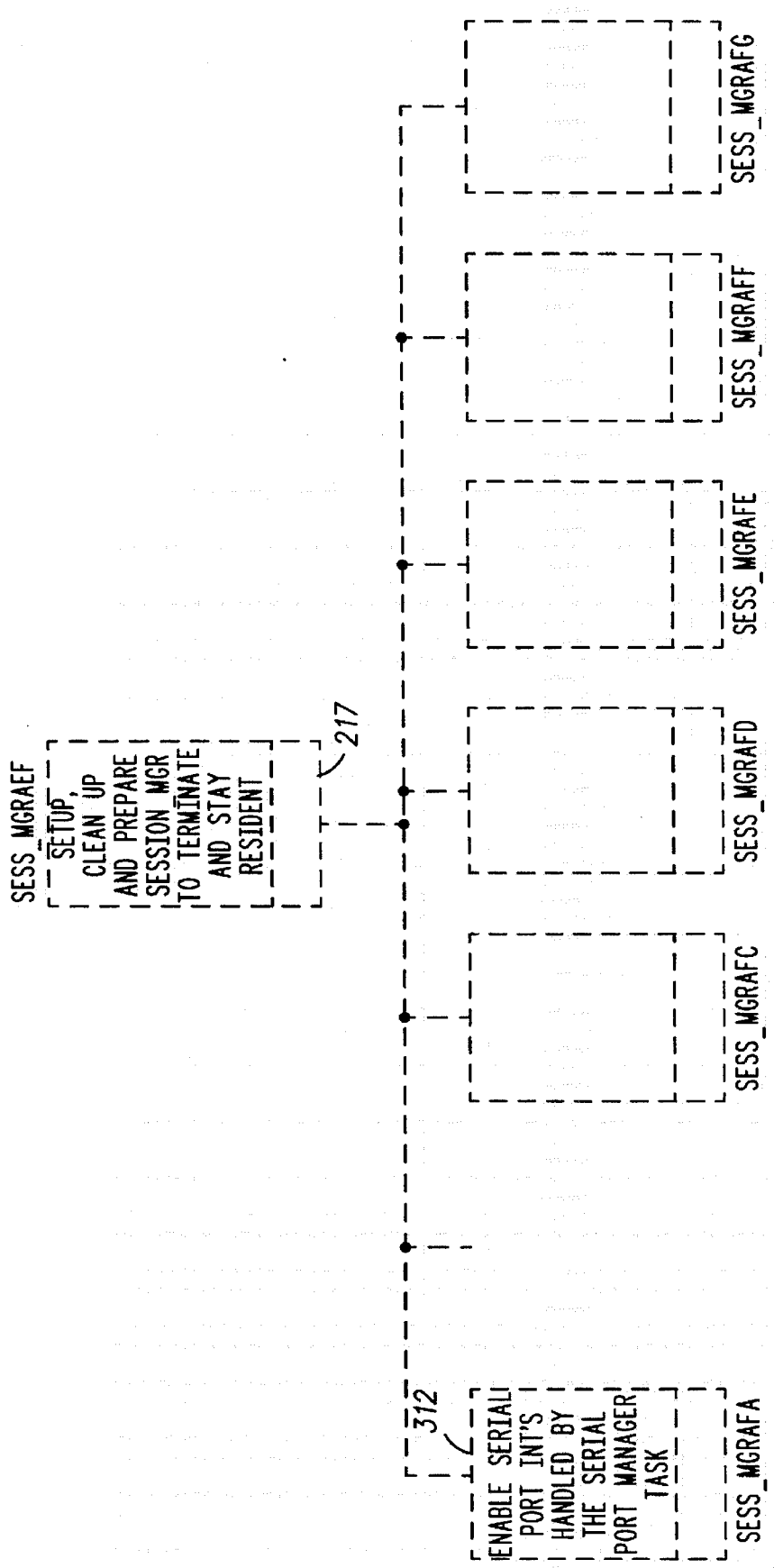
FIG. 15 shows a procedure call-tree for the routine SETUP, CLEAN UP, AND PREPARE SESSION_MGR TO TERMINATE AND STAY RESIDENT in accordance with a preferred embodiment of the invention.

The pseudo-code listing for FIG. 15 comprises a procedure call-tree for the routine SETUP, CLEAN UP, AND PREPARE SESSION_MGR TO TERMINATE AND STAY RESIDENT 217. The procedure SETUP, CLEAN UP, AND PREPARE SESSION_MGR TO TERMINATE AND STAY RESIDENT 217 calls the sub-procedure ENABLE SERIAL PORT INT'S HANDLED BY THE SERIAL PORT MANAGER TASK 312.

```
ENABLE SERIAL PORT INT'S HANDLED BY THE SERIAL PORT MANAGER TASK [A]
```

Box SESS_MGRAFA

The expanded pseudo-code listing for ENABLE SERIAL PORT INT'S HANDLED BY THE SERIAL PORT MANAGER TASK 312 is shown below. The pseudo-code is described in sufficient detail without further explanation.

---

Initialize the serial port setting all the related parameters (baud, parity, stop bits etc.)

---

Box SESS_MGRAG

The expanded pseudo-code listing for DISPLAY SIGN ON SCREEN 218 (FIG. 7) is shown below. The pseudo-code is described in sufficient detail without further explanation.

---

The sign on screen is displayed once the program is terminated and stays resident.
The sign on screen is the product logo.
In the sign on screen, the name of the product and the version number is displayed.

---

Box SESS_MGRB

The pseudo-code listing for HANDLE INBOUND MESSAGES 203 (FIG. 6) is shown below. When the scheduler interrupt is received, the routine begins execution. If at any point the routine "exits", execution stops until the next scheduler interrupt is received.

In order to enable multiple applications 20, 22 to share a single Shared Data Communication Device 30 (FIG. 5), the invention has identified each application's communication "channel" as a session. A current session is the session that has control of the CPU 10 (FIG. 2) at that particular time. The invention employs loops and other program controls, as described below, to enable effective sharing of CPU time for all of the applications 20, 22, or sessions, that have a need to share the single Shared Data Communication Device 30 (FIG. 5).

The routine first checks to see if any serial data is available, and if not, the routine exits and waits for the next scheduler interrupt. Otherwise, a loop is entered until the current session equals the start session—the first session that was originally processed. First the Shared Data Communication Device 30 (FIG. 5) is checked to get the number of waiting messages for the current session. If no messages are waiting for the current session, the next session in the cycle is checked for waiting messages.

If there are messages waiting for the current session, they are read from the Receive Buffer 104 (FIG. 5), until it is empty, and copied into the current session's in-bound queue. That queue's pointers and counters are updated. A notification data structure is created by the Receive Task 107 (FIG. 5), and the application is notified directly (via interrupt) or it may be notified indirectly via the Notification Manager 40, that the current session has messages, or responses to messages, waiting.

The current session is set to the next session in the cycle, the serial COM Port 101 (FIG. 5) is made available, and the routine exits, until the next scheduler interrupt occurs. This loop is performed until all sessions (applications) utilizing the invention have been serviced by processing the received messages.

---

```
/* When EXIT is used this routine Terminates and Stays Resident until
next event resumes it */
UPON INTERRUPT from the scheduler (periodic)
  EXECUTE
    IF no serial data is available (flag is set)
      THEN exit
    ENDIF
    start_session = current_session
    REPEAT
      In local command mode query a predetermined register to get
        number of waiting messages for the session
      IF no waiting messages THEN
      THEN
        set current_session to the next session
      ELSE /* Messages are waiting so process these messages */
        Go on-line for the current session
          (which is already at handshake mode)
        Delay for X time
          (In order to let the Shared Data Communication Device 30
          (FIG. 5) send automatically stored session's
          messages to the DTE)
        WHILE (DTE receive buffer is not empty)
        DO
          Read message (Which may be response or data)
          Copy message into the session queue on the DTE
          Update queue counters, pointers etc.
        ENDWHILE
        Go off-line into local command mode
        Create a notification data structure for the current session
          Name of application to notify
          Session number which is being used by the application
          Number of waiting messages
        IF direct notification set for current session
          THEN
            Notify the foreground application directly
              (setting a flag, using an interrupt call,...)
        ENDIF
        Set a notification event for the notification routine
          (To perform the indirect notification)
        Set current_session to the next session in the cycle
        Unblock the serial port
        exit /* Hibernate until next time being executed */
      ENDIF
    UNTIL ( current_session EQ start_session )
    ENDUNTIL
ENDEXECUTE
```

---

Box SESS_MGRC

The pseudo-code listing for HANDLE SERIAL PORT INTERRUPTS 204 (FIG. 6) is shown below. When a serial port interrupt is received, the routine begins execution. If the serial port interrupt is "transmit ready", then the next byte from the Transmit Buffer 105 (FIG. 5) was transmitted.

If the serial port interrupt is "received byte", a data byte is read from the serial COM Port 101 (FIG. 5) and stored in the next free space in the Receive Buffer 104 (FIG. 5). Then a flag is set to indicate the arrival of serial data.

---

```
UPON INTERRUPT from serial port
  EXECUTE
    CASE OF serial port interrupt DO
      CASE transmit ready :
        Next byte from the transmit buffer is transmitted
      CASE received byte :
        Byte is read and stored into the next free slot in the receive
          buffer
        Set a flag to specify the arrival of serial data
    ENDCASE
ENDEXECUTE
```

---

Box SESS_MGRD

The pseudo-code listing for HANDLE OUTBOUND MESSAGES 205 (FIG. 6) is shown below. When a scheduler interrupt for the Transmit Task 108 (FIG. 5) is received, the routine begins execution.

The routine begins by processing the Emergency (priority) Queue 115 (FIG. 4) first. The routine gets the priority message from the Emergency Queue 115 (FIG. 4) and sends it to the Shared Data Communication Device 30 (FIG. 5). The routine then receives a return status from the Shared Data Communication Device 30 (FIG. 5) indicating whether the send was successful. The Emergency Queue 115 (FIG. 4) variables are updated, and the message is cleared from the Emergency Queue 115 (FIG. 4). The routine continues processing the Emergency Queue 115 (FIG. 4) until it is empty. The routine exits, giving up control for other tasks which may be scheduled to run, after each priority message is processed, in order to handle any waiting incoming messages. The CPU 10 (FIG. 2) then returns control to this routine to continue emptying the Emergency Queue 115 (FIG. 4).

The routine then repeats the same processing detailed above with the Regular Queue 114 (FIG. 4). The routine continues processing the Regular Queue 114 (FIG. 4) until it is empty. The routine Terminates and Stays Resident (TSR) after each regular message is processed, in order to handle any waiting incoming messages or emergency outgoing messages. The CPU 10 (FIG. 2) then returns control to this routine to continue emptying the Regular Queue 114 (FIG. 4).

When the Regular Queue 114 (FIG. 4) has been emptied, and all regular messages have been sent, processing stops for this routine until the next scheduler interrupt is received.

```
COMMENT
    An event is set to resume this task once the user application
    issues a "send message" service request. The scheduled event will
    resume this task only if the CPU is free, otherwise it will occur each
    clock tick until the CPU is released
ENDCOMMENT
/*when EXIT is used this routine exits until the next scheduler event
    resumes it */
UPON INTERRUPT from the scheduler
    EXECUTE
        /* First handle emergency messages queue */
        IF emergency queue is not empty
            Get message from queue
            Send the message to the shared data communication device
            Get return status specifying that the message was successfully
                sent to the shared data communication device
            Update emergency queue related variables/counters
                (# of messages, # of bytes used, head & tail pointers etc.)
            Discard message from queue
            EXIT
        ENDIF
        /* Handle non-emergency messages queue */
        IF send queue is not empty
            Get message from queue
            Send the message to the shared data communication device
            Get return status specifying that the message was successfully
                sent to the shared data communication device
            Update send queue related variables/counters
                (# of messages, # of bytes used, head & tail pointers etc.)
            Discard message from queue
            EXIT
        ENDIF
    ENDEXECUTE
```

Box SESS_MGRE

Figure 16:
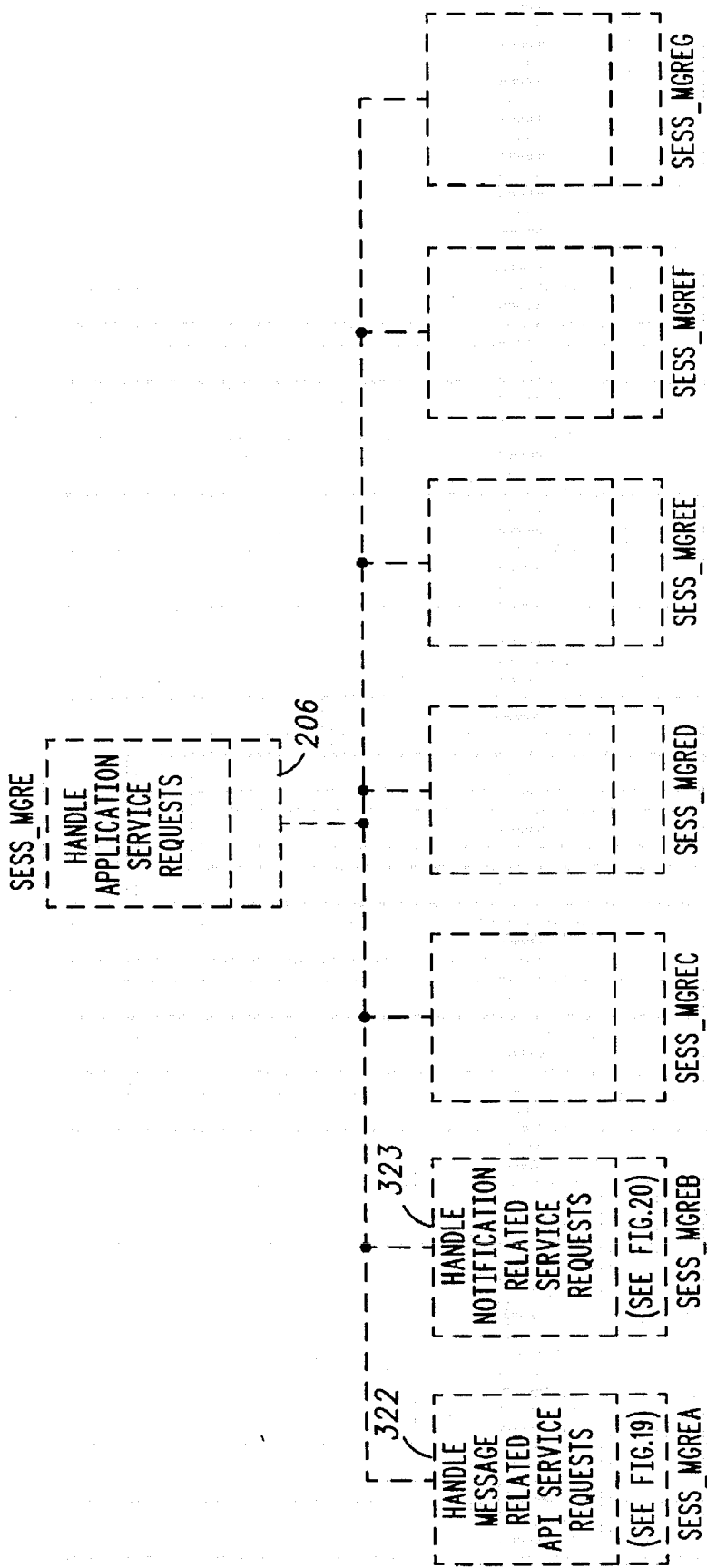
FIG. 16 shows a procedure call-tree for the routine HANDLE APPLICATION SERVICE REQUESTS in accordance with a preferred embodiment of the invention.

The pseudo-code listing for FIG. 16 comprises a procedure call-tree for the routine HANDLE APPLICATION SERVICE REQUESTS 206. The procedure HANDLE APPLICATION SERVICE REQUESTS 206 calls the sub-procedures, HANDLE MESSAGE RELATED SERVICE REQUESTS 322 and HANDLE NOTIFICATION RELATED SERVICE REQUESTS 323, in the sequence indicated in the pseudo-code listing below. When an application interrupt is received, the routine begins execution.

```
IF application request is message related
    THEN
        HANDLE MESSAGE RELATED SERVICE REQUESTS [A]
ENDIF
IF application request is notification related
    THEN
        HANDLE NOTIFICATION RELATED SERVICE REQUESTS [B]
ENDID
```

Box SESS_MGREA

Figure 17:
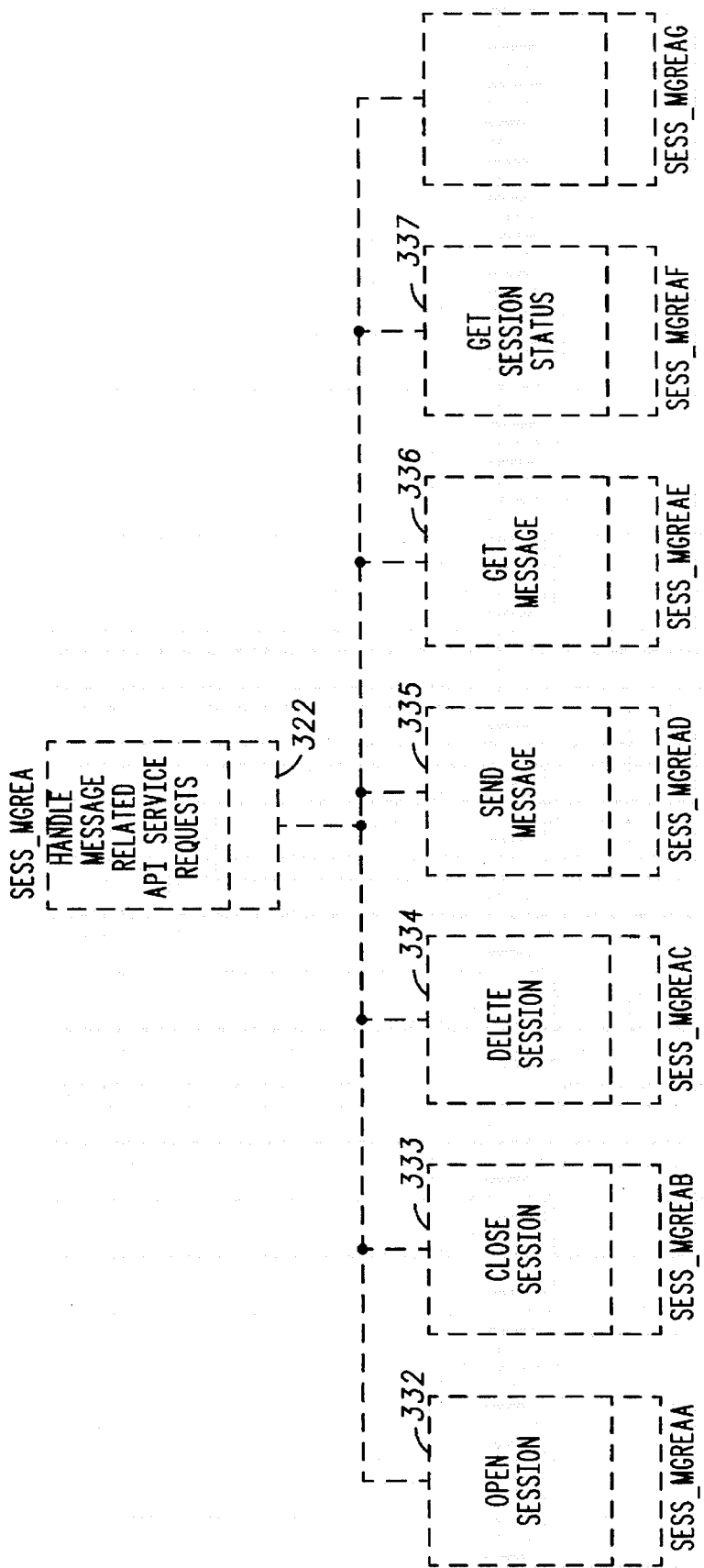
FIG. 17 shows a procedure call-tree for the routine HANDLE MAILBOX API SERVICE REQUESTS in accordance with a preferred embodiment of the invention.

The pseudo-code listing for FIG. 17 comprises a procedure call-tree for the routine HANDLE MESSAGE RELATED SERVICE REQUESTS 322. The procedure HANDLE MESSAGE RELATED SERVICE REQUESTS 322 calls the sub-procedures, OPEN SESSION 332, CLOSE SESSION 333, DELETE SESSION 334, SEND MESSAGE 335, GET MESSAGE 336, and GET SESSION STATUS 337, when the request type is "open", "close", "delete", "send", "get", and "status", respectively.

```
CASE OF request type DO
    CASE open    :
        OPEN SESSION [A]
    CASE close   :
        CLOSE SESSION [B]
    CASE delete  :
        DELETE SESSION [C]
    CASE send    :
        SEND MESSAGE [D]
    CASE get     :
        GET MESSAGE [E]
    CASE status  :
        GET SESSION STATUS [F]
ENDCASE
```

Box SESS_MGREAA

The pseudo-code listing for OPEN SESSION 332 (FIG. 17) is shown below. The pseudo-code is described in sufficient detail without further explanation.

```
Open an application's session and mark it active
Allocate and initiate session queues
Return a session handle
```

Box SESS_MGREAB

The pseudo-code listing for CLOSE SESSION 333 (FIG. 17) is shown below. The pseudo-code is described in sufficient detail without further explanation.

```
Use a session handle to mark the session suspended
Keep handling session queues and inbound (received) messages
```

Box SESS_MGREAC

The pseudo-code listing for DELETE SESSION 334 (FIG. 17) is shown below. The pseudo-code is described in sufficient detail without further explanation.

Identify session by its handle and mark it deleted
Empty all session queues and deallocate queue's memory
/* All queued messages are lost */
The user is requested to confirm session deletion

Box SESS_MGREAD

The pseudo-code listing for SEND MESSAGE 335 (FIG. 17) is shown below. The pseudo-code is described in sufficient detail without further explanation.

Get a data buffer to be sent as a message
Copy the data buffer content into a local data buffer
Store the message in the proper session's queue according to priority (i.e. emergency, regular)

Box SESS_MGREAE

The pseudo-code listing for GET MESSAGE 336 (FIG. 17) is shown below. The pseudo-code is described in sufficient detail without further explanation.

Get a message (if one exists) from the proper session's queue (i.e. a message or response)
Copy the message to the application's data buffer allocated by the application
Discard message from the local queues

Box SESS_MGREAF

The pseudo-code listing for GET SESSION STATUS 337 (FIG. 17) is shown below. The pseudo-code is described in sufficient detail without further explanation.

Return status information regarding the session, such as number of stored messages in each queue, session active/suspended status, etc.

Box SESS_MGREB

Figure 18:
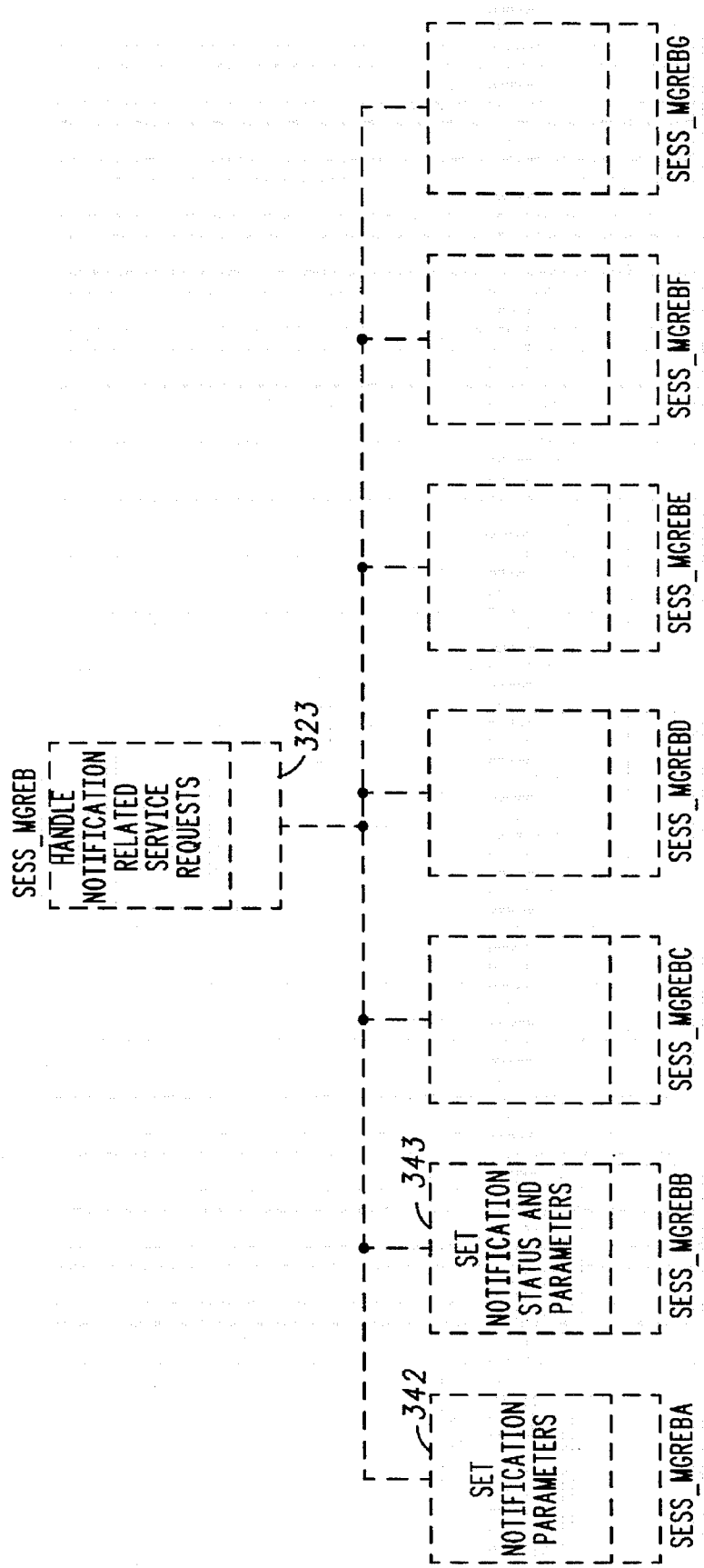
FIG. 18 shows a procedure call-tree for the routine HANDLE NOTIFICATION SERVICE REQUESTS in accordance with a preferred embodiment of the invention.

The pseudo-code listing for FIG. 18 comprises a procedure call-tree for the routine HANDLE NOTIFICATION RELATED SERVICE REQUESTS 323. The procedure HANDLE NOTIFICATION RELATED SERVICE REQUESTS 323 calls the sub-procedures, SET NOTIFICATION PARAMETERS 342 and GET NOTIFICATION STATUS AND PARAMETERS 343, when the request type is "set parameters" or "get status", respectively.

```
CASE OF request type DO
    CASE set parameters :
        SET NOTIFICATION PARAMETERS [A]
    CASE get status     :
        GET NOTIFICATION STATUS AND PARAMETERS [B]
ENDCASE
```

SESS_MGREBA

The pseudo-code listing for SET NOTIFICATION PARAMETERS 342 (FIG. 18) is shown below. The pseudo-code is described in sufficient detail without further explanation.

Get the new values for the notification attributes such as visual notification, audible notification, and direct notification
Store the values in the Session Manager configuration record

Box SESS_MGREBB

The pseudo-code listing for GET NOTIFICATION STATUS AND PARAMETERS 343 (FIG. 18) is shown below. The pseudo-code is described in sufficient detail without further explanation.

Fetch the requested value of a notification attribute from the Session Manager configuration record.
Return the requested attribute to the requesting application.

Box SESS_MGRF

Figure 19:
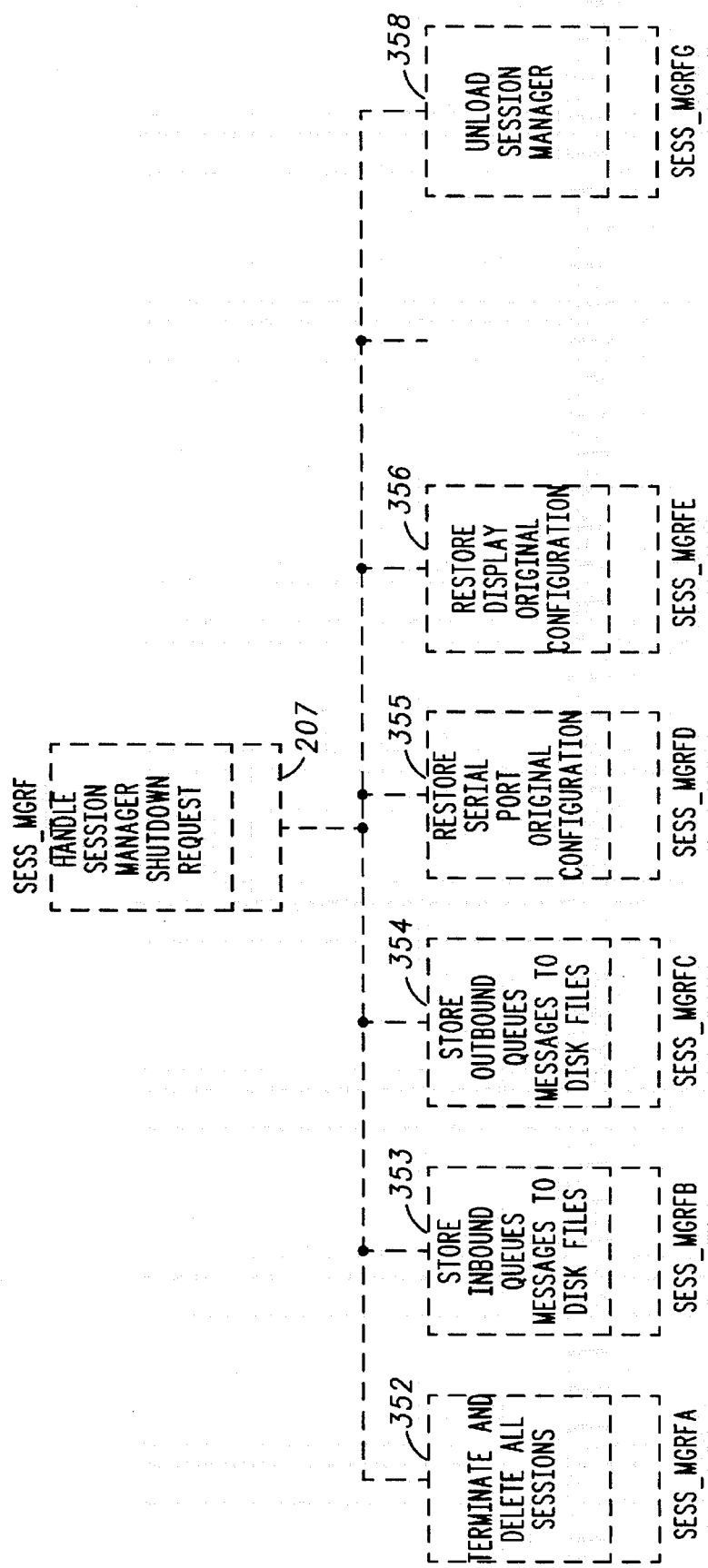
FIG. 19 shows a procedure call-tree for the routine HANDLE SESSION MANAGER SHUTDOWN REQUESTS in accordance with a preferred embodiment of the invention.

The pseudo-code listing for FIG. 19 comprises a procedure call-tree for the routine HANDLE SESSION MANAGER SHUTDOWN REQUEST 207. The procedure HANDLE SESSION MANAGER SHUTDOWN REQUEST 207 calls the sub-procedures, TERMINATE AND DELETE ALL SESSIONS 352, STORE INBOUND QUEUES' MESSAGES TO DISK FILES 353, STORE OUTBOUND QUEUES' MESSAGES TO DISK FILES 354, RESTORE SERIAL PORT ORIGINAL CONFIGURATION 355, RESTORE DISPLAY ORIGINAL CONFIGURATION 356, and UNLOAD SESSION MANAGER 358, in the sequence indicated in the pseudo-code listing below. The pseudo-code is described in sufficient detail without further explanation.

```
/* Handle active session shutdown */
IF there is/are any active session(s)
    THEN
        TERMINATE AND QUIT ALL SESSIONS [A]
        STORE INBOUND QUEUES' MESSAGES TO DISK FILES [B]
        STORE OUTBOUND QUEUES' MESSAGES TO DISK FILES [C]
ENDIF
/* Restore the PC to its original configuration */
RESTORE SERIAL PORT ORIGINAL CONFIGURATION [D]
RESTORE DISPLAY ORIGINAL CONFIGURATION [E]
/* Free memory occupied by the session manager */
UNLOAD SESSION MANAGER [G]
```

Box SESS_MGRG

The pseudo-code listing for HANDLE APPLICATION NOTIFICATION SERVICE 208 (FIG. 6) is shown below. When a scheduler interrupt is received, the routine begins execution.

The routine retrieves the notification data for the current session. If direct notification is enabled for the current session, then the direct notification flag is set in the application address space or an application's designated call-back routine is called; otherwise, nothing is done.

The routine retrieves the internal Notification Attributes 123 (FIG. 4) to generate an indirect notification to the User 126 (FIG. 4) for the current session.

```
COMMENT
    Notification data is prepared by the Message Manager Receive Task
    as messages are being received for a session. This data is
    placed in a predetermined memory location which is accessible to
this
    function.
ENDCOMMENT
UPON INTERRUPT from the scheduler indicating to invoke the
Notification Manager
    EXECUTE
        Get the current notification data structure
            (application name, session number, number of waiting messages)
        IF Direct notification is enabled for the application
        THEN
            Set direct notification flag in the application address space or
            call a dedicated call-back routine designated by the application
            to handle its notification events.
        ELSE
        ENDIF
        Look-up in Notification Attribute data store what attributes to set
        for the indirect notification (pop-up, tone, interval)
    ENDEXECUTE
```

It will be apparent to those skilled in the art that the disclosed invention may be modified in numerous ways and may assume many embodiments other than the preferred form specifically set out and described above.

For example, the transceiver devices may communicate with each other in any suitable manner, as described with reference to FIGS. 22–23.

Figure 20:
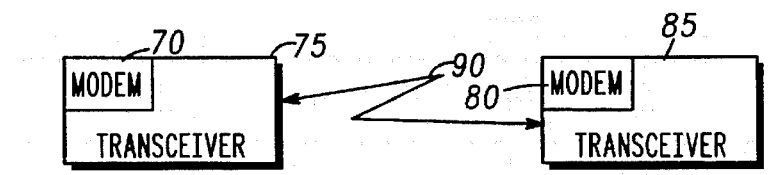
FIG. 20 shows a block diagram depicting a pair of transceivers communicating via direct radio frequency signals in accordance with another embodiment of the invention.

FIG. 20 shows a block diagram depicting a pair of transceivers communicating via direct radio frequency signals in accordance with another embodiment of the invention. Devices 75 and 85 send and receive RF signals 90 directly via modems 70 and 80 to each other in order to transfer data from one to the other.

Figure 21:
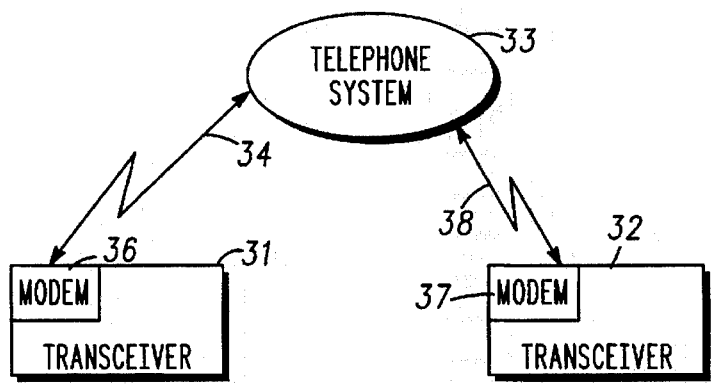
FIG. 21 shows a block diagram depicting a pair of transceivers communicating via telephone line in accordance with another embodiment of the invention.

FIG. 21 shows a block diagram depicting a pair of transceivers communicating via telephone line in accordance with another embodiment of the invention. Devices 31 and 32 send and receive data to and from each other via modems 36 and 37, communications infrastructure 33, and telephone lines 34 and 38.

Figure 22:
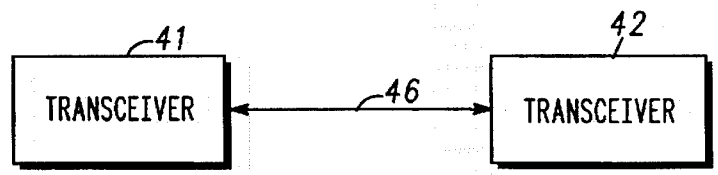
FIG. 22 shows a block diagram depicting a pair of transceivers communicating via direct wire line in accordance with another embodiment of the invention.

FIG. 22 shows a block diagram depicting a pair of transceivers communicating via direct wireline in accordance with another embodiment of the invention. Transceiver devices 41 and 42 exchange data over direct wireline 46.

Figure 23:
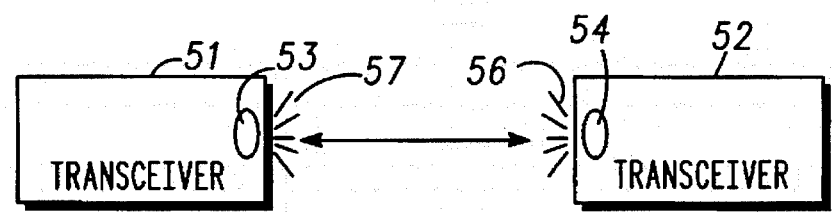
FIG. 23 shows a block diagram depicting a pair of transceivers communicating via infra-red communication links in accordance with another embodiment of the invention.

FIG. 23 shows a block diagram depicting a pair of transceivers communicating via infra-red communication links in accordance with another embodiment of the invention. Devices 51 and 52 send and receive data to and from each other via infra-red (IR) transceivers 53 and 54. The data is transferred utilizing IR signals 56 and 57.

OPERATION OF A PREFERRED EMBODIMENT

With reference now to FIGS. 3–5, the operation of a preferred embodiment of the invention will be described. First, the case will be described wherein a plurality of applications may send data substantially simultaneously over a shared device, such as Radio Frequency Modem 30.

First a first application 20, such as a spreadsheet application, opens a session, issues a send command, and transmits its current edited file to the API Manager 44. This transmission is done by using the predefined library of commands 24.

Substantially simultaneously, a second application 22, such as a database application, opens a session and issues a send command to the API Manager 44. Each send command is accompanied by a corresponding message, its specified target, its level of urgency, an identification of the session used and the actual message text.

The API Manager 44 writes each respective message or command to first and second queues in the Queue Manager 47. These queues are dedicated to the present sessions of the first and second applications, respectively. Other queues within Queue Manager 47 are dedicated to other sessions which may be opened by the first and second applications.

The queues are polled periodically for pending messages or commands by the Transmit Task 108 of the Message Manager 43. When the first queue has been read, its stored message or command is written into the Transmit Buffer 105 of Device Manager 48. The COM ISR 103 reads the Transmit Buffer 105 and writes the stored message or command to the RF Modem 30 via the Communication Port 101. Next the second queue is read and its stored message or command is written into the Transmit Buffer 105 of the Device Manager 48, whereupon the COM ISR 103 reads the Transmit Buffer 105 and writes the stored message or command to the RF Modem 30 via the Communications Port 101.

Next the case will be described wherein a plurality of applications may receive data simultaneously from the RF Modem 30. First, incoming data is received at the RF Modem 30 and is written into the Device Manager's Receive Buffer 104. The first data is periodically read from the Receive Buffer 104 by the Device State Machine Task 106 and written into a first one of the queues in the Queue Manger 47, such queue being dedicated to the current session of a first application (e.g. application 20) in the In-bound Queues 109. Substantially simultaneously, second incoming data is received at RF Modem 30 and is written into the Device Manager's Receive Buffer 104. The second data is periodically read from the Receive Buffer 104 by the Device State Machine Task 106 and written into a second one of the queues in the Queue Manger 47, such queue being dedicated to the current session of a second application (e.g. application 22) in the In-bound Queues 109.

The first data is held in the first queue until a receive command is issued from application 20. The user of application 20 is notified by either the Notification Manager 40 or directly, that data for application 20 has arrived. A receive command is generated from application 20, using the Command Library 24. The command is received by the API Manager 44, which in turn gets the data from the Queue Manager 47 via In-bound Queues 109. The data is then passed to the application 20.

Likewise, the second data is held in the second queue until a receive command is issued from application 22. The user of application 22 is notified by either the Notification Manager 40 or directly, that data for application 22 has arrived. A receive command is generated from application 22, using the Command Library 26. The command is received by the API Manager 44, which in turn gets the data from the Queue Manager 47 via In-bound Queues 109. The data is then passed to the application 22.

While the present disclosure discusses data transfer between a transceiver source and a destination, the inventive concept could also be extended to a source transmitting to many destinations (i.e. broadcast), or many sources transmitting to one destination (i.e. data collection).

It will be appreciated by those skilled in the art that the present invention permits multiple concurrently executing applications to share a single radio frequency communication device. A single computer program controls the communication device and permits simultaneous independent interface to each of the software applications.

Accordingly, it is intended by the appended claims to cover all modifications of the invention which fall within the true spirit and scope of the invention.

What is claimed is:

1. In a data processing system comprising a processor, a memory for storing a plurality of software applications, and a shared radio-frequency modem, a method for managing said radio frequency modem comprising:
   a. providing a predetermined interface in the form of a command set common to all of said applications, said commands being used to control communication between said applications and said predetermined interface;
   b. providing a single computer program that controls the radio-frequency modem and permits simultaneous, independent interface to each of said applications by way of said commands by;
      i. issuing a first command from a first one of said applications;
      ii. issuing a second command from a second one of said applications;
      iii. storing said first and second commands at first and second queues respectively; and
      iv. based on the step of storing, writing said first and second commands to said shared radio-frequency modem.

2. In a data processing system comprising a processor, a shared radio-frequency modem, and a memory for storing a plurality of applications and for storing a computer program to control the radio-frequency modem and permit simultaneous, independent interface by said modem to each of said applications by way of said commands, said computer program comprising:
   a predetermined set of commands common to all of said applications, said commands being used to control communication between said applications and said computer program;
   an application manager for executing said commands;
   a queue manager responsive to said application manager, said queue manager comprising a plurality of queues;
   a message manager coupled to said queue manager;
   a device manager coupled between said message manager and a communications port, said device manager comprising a transmit buffer;
   a method for enabling said plurality of applications to send data simultaneously over said radio-frequency modem comprising the steps of:
      a. issuing a send command from a first one of said applications to said application manager;
      b. issuing a send command from a second one of said applications to said application manager;
      c. receiving said send commands, each accompanied by a message or command, at said application manager and writing said respective message or command to first and second queues in said queue manager;
      d. polling said queues for pending messages or commands;
      e. writing said message or command stored in said first queue into said transmit buffer of said device manager;
      f. reading said buffer and writing said stored message or command to said shared radio-frequency modem via said communications port;
      g. writing said message or command stored in said second queue into said transmit buffer of said device manager; and
      h. reading said buffer and writing said stored message or command to said shared radio-frequency modem via said communications port.

3. In a data processing system comprising a processor, a shared radio-frequency modem, and a memory for storing a plurality of applications and for storing a computer program to control the radio-frequency modem and permit simultaneous, independent interface by said modem to each of said applications by way of said commands, said computer program comprising:
   a predetermined set of commands common to all of said applications, said commands being used to control communication between said applications and said computer program;
   an application manager for executing said commands;
   a queue manager responsive to said application manager, said queue manager comprising a plurality of queues;
   a message manager coupled to said queue manager;
   a device manager coupled between said message manager and a communications port, said device manager comprising a receive buffer;
   a method for enabling said plurality of applications to receive data simultaneously over said radio-frequency modem comprising the steps of:
      a. receiving first incoming data at said radio-frequency modem;
      b. writing said first data into said device manager's receive buffer;
      c. reading said first data from said receive buffer;
      d. writing said first data into a first one of said queues in said queue manager;
      e. receiving second incoming data at said radio-frequency modem;
      f. writing said second data into said device manager's receive buffer;
      g. reading said second data from said receive buffer;
      h. writing said second data into a second one of said queues in said queue manager;
      i. holding said first data in said first queue until a receive command is issued from a first one of said one applications;
      j. notifying the user that data for said first application has arrived;
      k. issuing a receive command from said first application to said application manager;
      l. receiving said receive command at said application manager from said first application and routing said data to said first application;
      m. holding said second data in said second queue until a receive command is issued from a second one of said one applications;
      n. notifying the user that data for said second application has arrived;
      o. issuing a receive command from said second application to said application manager; and
      p. receiving said receive command at said application manager from said second application and routing said data to said second application.

4. The method recited in claim 3, wherein in steps j) and n) the corresponding application is notified that said data has arrived.

5. In a data processing system comprising a processor, a shared radio-frequency modem, and a memory for storing a plurality of applications and for storing a computer program to control the radio-frequency modem and permit simultaneous, independent interface by said modem to each of said applications by way of said commands, said computer program comprising:

a predetermined set of commands common to all of said applications, a plurality of said commands being incorporated into each of said applications, said commands being used to control communication between said applications and said computer program;

an application manager responsive to said plurality of commands from all of said applications, for executing said commands;

a queue manager responsive to said application manager, said queue manager comprising an emergency queue, regular queue, command queue, a plurality of in-bound message queues, and a plurality of in-bound response queues;

a message manager comprising a transmit task and a receive task, said transmit task being coupled to a first plurality of queues, said receive task being coupled to a second plurality of queues;

a device manager coupled between said message manager and a communications port, said device manager managing the transmission and receipt of data with respect to said communications port, and said device manager comprising a transmit buffer, a receive buffer, and a device state machine task;

a method for enabling said plurality of applications to send data simultaneously over said radio-frequency modem comprising the steps of:
 a. issuing a send command from a first one of said applications to said application manager;
 b. issuing a send command from a second one of said applications to said application manager;
 c. receiving said send commands and corresponding data to be sent at said application manager from said applications and performing one of the following substeps for each of said send commands;
  i. writing said data to said emergency queue, if data to be sent is a high priority message, or;
  ii. writing said data to said regular queue, if data to be sent is a normal priority message, or;
  iii. writing said data to said command queue, if data to be sent is a command to control said shared radio-frequency modem;
 d. polling said emergency, regular, and command queues in said transmit task of said message manager for pending messages or commands by performing the following substeps in sequence:
  i. checking said emergency queue for said high priority messages and sending said high priority messages to said device state machine task of said device manager;
  ii. checking said regular queue for said normal priority messages and sending said normal priority messages to said device state machine task of said device manager;
  iii. checking said command queue for said commands and sending said commands to said device state machine task of said device manager;
 e. writing said messages or commands stored in said device state machine task into said transmit buffer of said device manager;
 f. reading said buffer and writing said stored messages or commands to said shared radio-frequency modem via said communications port.

6. The method recited in claim 5, wherein in step (f) said buffer is read in a FIFO fashion.

7. In a data processing system comprising a processor, a shared radio-frequency modem, and a memory for storing a plurality of applications and for storing a computer program to control the radio-frequency modem and permit simultaneous, independent interface by said modem to each of said applications by way of said commands, said computer program comprising:

a predetermined set of commands common to all of said applications, a plurality of said commands being incorporated into each of said applications, said commands being used to control communication between said applications and said computer program;

an application manager responsive to said plurality of commands from all of said applications, for executing said commands;

a queue manager responsive to said application manager, said queue manager comprising an emergency queue, regular queue, command queue, a plurality of in-bound message queues, and a plurality of in-bound response queues;

a message manager comprising a transmit task and a receive task, said transmit task being coupled to a first plurality of queues, said receive task being coupled to a second plurality of queues;

a device manager coupled between said message manager and to a communications port, said device manager managing the transmission and receipt of data with respect to said communications port, and said device manager comprising a transmit buffer, a receive buffer, and a device state machine task;

a method for enabling said plurality of applications to receive data simultaneously over said radio-frequency modem comprising the steps of:
 a. receiving first incoming data at said radio-frequency modem;
 b. writing said first data into said device manager's receive buffer;
 c. reading said first data from said receive buffer;
 d. sending said first data into said message manager's receive task, and performing one of the following substeps:
  i. placing said first data into a first one of said queue manager's in-bound message queues, if said data is a new incoming message;
  ii. placing said first data into a first one of said queue manager's in-bound response queues, if said data is a response to a previously sent message of said one application;
 e. holding said first data in said first in-bound message queue or said first in-bound response queue until a receive command is issued from said one application;
 f. notifying the user that a message or response for said one application has arrived;
 g. issuing a receive command from said one application to said application manager;
 h. receiving said receive command at said application manager from said one application and routing said data to said one application.

8. The method recited in claim 7, wherein said data is written into said device manager's receive buffer in FIFO fashion.

9. The method recited in claim 7 and further comprising the steps of:

i. receiving second incoming data at said radio-frequency modem substantially concurrently with the receipt of said first incoming data; and j. executing steps (b) through (h) substantially concurrently regarding said first and second incoming data.

10. The method recited in claim 7, wherein in step (f) said one application is notified that said data has arrived.

11. The method recited in claim 7, wherein for said one application there are a plurality of communication channels of, each of said channels comprising an inbound message queue and an inbound response queue in said queue manager.

* * * * *